US008599913B1

(12) United States Patent  
Brown et al.

(10) Patent No.: US 8,599,913 B1
(45) Date of Patent: Dec. 3, 2013

(54) DATA REGENERATION APPARATUS AND METHOD FOR PCI EXPRESS

(75) Inventors: David Alan Brown, Carp (CA); Dzung Tran, San Jose, CA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 197 days.

(21) Appl. No.: 13/195,685

(22) Filed: Aug. 1, 2011

(51) Int. Cl.
*H03H 7/30* (2006.01)
*H03H 7/40* (2006.01)
*H03K 5/159* (2006.01)

(52) U.S. Cl.
USPC .......................................... 375/232; 708/323

(58) Field of Classification Search
USPC ......... 375/229–233, 257, 259–260, 285, 340, 375/350, 219, 220, 296; 708/322–323, 300; 333/28 R
See application file for complete search history.

(56) References Cited

U.S. PATENT DOCUMENTS

| | | | | |
|---|---|---|---|---|
| 5,615,235 A | * | 3/1997 | Kakuishi et al. | 375/355 |
| 7,324,559 B2 | * | 1/2008 | McGibney | 370/509 |
| 7,801,233 B1 | * | 9/2010 | Chow et al. | 375/260 |
| 2002/0181438 A1 | * | 12/2002 | McGibney | 370/350 |
| 2005/0226355 A1 | * | 10/2005 | Kibune et al. | 375/348 |
| 2007/0147489 A1 | * | 6/2007 | Sun et al. | 375/231 |
| 2009/0296798 A1 | * | 12/2009 | Banna et al. | 375/229 |
| 2010/0226422 A1 | * | 9/2010 | Taubin et al. | 375/231 |
| 2012/0141139 A1 | * | 6/2012 | Bakhru et al. | 398/158 |

* cited by examiner

*Primary Examiner* — Jean B Corrielus
(74) *Attorney, Agent, or Firm* — Kenneth Glass; Stanley J. Pawlik; Glass & Associates

(57) ABSTRACT

A data regeneration device regenerates a digital signal in a low-speed pass-through mode of operation, performs an upstream link equalization procedure on an upstream data link in an equalization mode of operation, performs a downstream link equalization procedure on a downstream data link in the equalization mode of operation, and regenerates the digital signal in a high-speed pass-through mode of operation. The data regeneration device transitions seamlessly from the low-speed pass-through mode of operation to the equalization mode of operation in compliance with a communication protocol. Moreover, the data regeneration device synchronizes completion of the upstream link equalization procedure with completion of the downstream link equalization procedure so that the data regeneration device transitions seamlessly from the equalization mode of operation to the high-speed pass-through mode of operation in compliance with the communication protocol.

19 Claims, 6 Drawing Sheets

DATA REGENERATION APPARATUS AND METHOD FOR PCI EXPRESS

BACKGROUND

Repeater devices and retimer devices are often employed in digital communication systems to improve signal integrity of a digital signal transmitted through a transmission medium. A repeater device improves signal integrity in a digital communication system by overcoming attenuation and some data dependant jitter of a digital signal that occurs when the digital signal is transmitted through a transmission medium. In operation, the repeater device receives the digital signal on a leg of the transmission medium and regenerates the digital signal along the next leg of the transmission medium. In this regeneration process, the repeater modifies one or more electrical characteristics of the digital signal, such as amplitude, slew rate, and edge to edge timing, without modifying digital information in the digital signal. As a result, the digital signal may be transmitted over a longer distance through the transmission medium while retaining a level of signal integrity.

A retimer device improves signal integrity in a digital communication system by synchronizing data edges of a digital signal to a clock signal. In this way, the retimer device removes all data dependant jitter and all random jitter between the data edges of the digital signal. In some applications, a digital signal includes a number of data streams each of which includes a portion of the digital signal. In these applications, the retimer device reduces jitter between data edges of the data streams and also reduces jitter between data edges across the data streams in the digital signal.

In the process of synchronizing data edges of a digital signal received on a leg of the transmission medium, a retimer device regenerates the digital signal along the next leg of the transmission medium by modifying one or more electrical characteristics of the digital signal without modifying digital information in the digital signal. In this way, the retimer overcomes attenuation of the digital signal that occurs when the digital signal is transmitted through the transmission medium. Because the retimer device performs a synchronization function in addition to performing a regenerating function on a digital signal, the retimer device requires additional circuitry and typically consumes more power in comparison to a repeater device that does not perform such a synchronization function. As a result, an integrated circuit implementation of a retimer device consumes more power and area than an integrated circuit implementation of the repeater device.

Many digital communication systems include packet switches to route data packets along communication paths in a communication network. In these communication paths, the data packets are transmitted through a transmission medium as a digital signal. A packet switch in the digital communication system receives data packets from a leg of a transmission medium along a data path and routes the data packets to a next leg of the transmission medium in the data path. In this process, the packet switch regenerates the digital signal including the data packets and synchronizes the data edges of the digital signal with a clock signal. Typically, the packet switch includes a switch fabric for routing the data packets along the data path in the transmission medium. Generally, the packet switch receives the data packets at an input port of the packet switch, selects one of the output ports of the packet switch based on content of the data packet, and routes the data through the switch fabric to the selected output port. In this way, the switch fabric performs a switching function to switch the data packet from the input port to the selected output port. Because the packet switch performs a switching function in addition to performing a regenerating function and a synchronizing function on the digital signal, the packet switch requires additional circuitry and typically consumes more power in comparison to repeater devices and retimer devices that do not perform such a switching function. As a result, an integrated circuit implementation of the packet switch consumes more power and area than integrated circuit implementations of the repeater devices and retimer devices.

SUMMARY

In various embodiments, a data regeneration device regenerates a digital signal in a low-speed pass-through mode of operation, performs an upstream link equalization procedure on an upstream data link in an equalization mode of operation, performs a downstream link equalization procedure on a downstream data link in the equalization mode of operation, and regenerates the digital signal in a high-speed pass-through mode of operation. The data regeneration device transitions seamlessly from the low-speed pass-through mode of operation to the equalization mode of operation in compliance with a communication protocol. Moreover, the data regeneration device synchronizes completion of the upstream link equalization procedure with completion of the downstream link equalization procedure so that the data regeneration device transitions seamlessly from the equalization mode of operation to the high-speed pass-through mode of operation in compliance with the communication protocol.

In various embodiments, the communication protocol is the Peripheral Component Interconnect Express (PCIe) 3.0 protocol. In these embodiments, the data regeneration device regenerates the digital signal at a low-speed data rate of either 2.5 gigatransfers per second (GT/s) or 5 GT/s in the low-speed pass-through mode of operation. Moreover, the data regeneration device regenerates the digital signal at a high-speed data rate of 8 GT/s in the high-speed pass-through mode of operation.

In contrast to repeater devices and retimer devices that regenerate a digital signal without modifying digital content of the digital signal, the data regeneration device modifies digital content of a digital signal when performing the equalization procedure to comply with the communication protocol. In contrast to a packet switch, the data regeneration device need not include circuitry for performing a switching function on the upstream digital signal or the downstream digital signal. Furthermore, the data regeneration device need not implement the entire communication protocol. Consequently, the data regeneration device requires less circuitry in comparison to a packet switch that performs such a switching function and implements the entire communication protocol. As a result, an integrated circuit implementation of the data regeneration device consumes less area and power in comparison to an integrated circuit implementation of the packet switch.

A data regeneration device, in accordance with one embodiment, regenerates a digital signal in compliance with a Peripheral Component Interconnect Express (PCIe) 3.0 protocol. The data regeneration device includes an upstream port, a downstream port, and a routing link coupled to both the upstream port and the downstream port. The routing link is configured to transmit a digital signal between the upstream port and the downstream port. The upstream port performs an upstream link equalization procedure on an upstream data link in compliance with the PCIe 3.0 protocol. The downstream port performs a downstream link equalization procedure on a downstream data link in compliance with the PCIe 3.0 protocol. Moreover, the data regeneration device is configured to perform a dual-delay interlocking operation so that the downstream link equalization procedure and the upstream link equalization procedure complete at substantially the same time.

In a further embodiment, the data regeneration device is further configured to regenerate the digital signal in compliance with the PCIe 3.0 protocol at a low-speed data rate in a low-speed pass-through mode of operation and transition from the low-speed pass-through mode of operation to the equalization mode of operation seamlessly in compliance with the PCIe 3.0 protocol. Additionally, the data regeneration device is further configured to transition from the equalization mode of operation to a high-speed pass-through mode of operation in compliance with the PCIe 3.0 protocol. The data regeneration device is further configured to regenerate the digital signal in compliance with the PCIe 3.0 protocol at a high-speed data rate in the high-speed pass-through mode of operation.

A method, in accordance with one embodiment, regenerates a digital signal in compliance with a Peripheral Component Interconnect Express (PCIe) 3.0 protocol. The method includes performing an upstream link equalization procedure on an upstream data link in compliance with the PCIe 3.0 protocol and performing a downstream link equalization procedure on a downstream data link in compliance with the PCIe 3.0 protocol. Additionally, the method includes performing a dual-delay interlocking operation so that the downstream link equalization procedure and the upstream link equalization procedure complete at substantially the same time.

Because the method performs a dual-delay interlocking operation, the method is capable of transitioning between a pass-through mode of operation and the equalization mode of operation in compliance with the PCIe 3.0 protocol. Moreover, the method need not perform a switching function on the upstream digital signal or the downstream digital signal to switch the digital signal from an input port to an output port of the data regeneration device. Furthermore, the method need not perform the entire PCIe 3.0 protocol. Consequently, the data regeneration device requires less circuitry in comparison to a packet switch that performs such a switching function and implements the entire PCIe 3.0 protocol. As a result, an integrated circuit implementation of the data regeneration device that performs the method consumes less area and power in comparison to an integrated circuit implementation of the packet switch.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
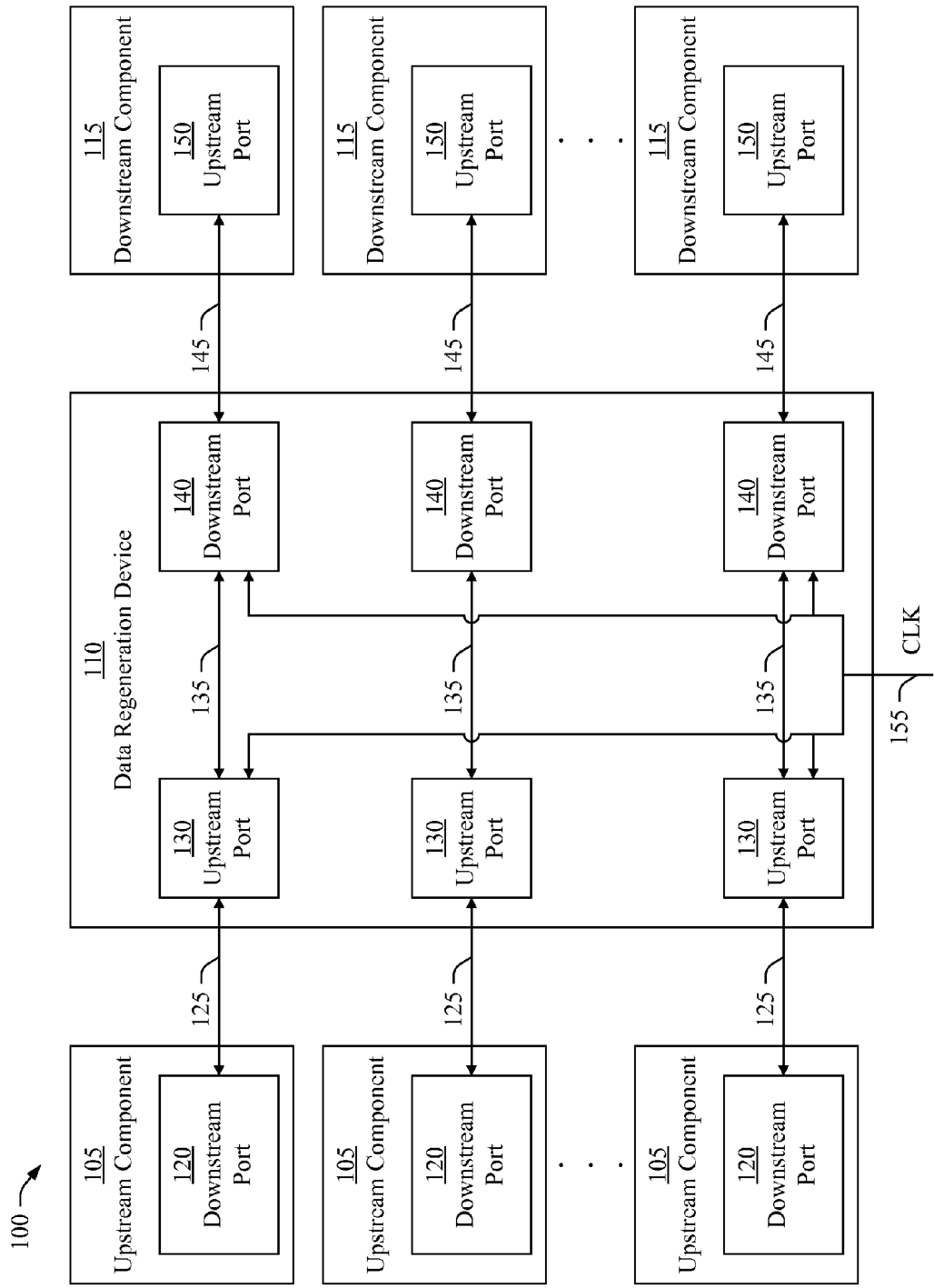
FIG. 1 is a block diagram of a communication system including a data regeneration device, in accordance with an embodiment of the present invention.

In various embodiments, a data regeneration device performs a multilink equalization procedure in an equalization mode of operation. In the multilink equalization procedure, the data regeneration device simultaneously performs an upstream link equalization procedure on an upstream data link and a downstream link equalization procedure on a downstream data link. Moreover, the data regeneration device performs a dual-delay interlocking operation so that the data regeneration device transitions from the equalization mode of operation to a pass-through mode of operation in compliance with a Peripheral Component Interconnect Express (PCIe) 3.0 protocol.

In contrast to repeater and retimer devices, the data regeneration device performs a portion of the PCIe 3.0 protocol for performing the upstream link equalization procedure and for performing the downstream link equalization procedure. Moreover, the data regeneration device need not perform a switching function of a packet switch. As a result, an integrated circuit implementation of the data regeneration device consumes less area and power in comparison to an integrated circuit implementation of the packet switch that performs such a switching function or implements the entire PCIe 3.0 protocol.

Overview of the PCIe Link Equalization Procedure

The Peripheral Component Interconnect Express (PCIe) Base Specification Revision 3.0 (PCIe 3.0 Specification) specifies a protocol for communication between components (i.e., physical PCIe devices) through a data link of a PCIe fabric. The protocol (i.e., PCIe 3.0 protocol) specifies use of an 8b/10b encoding for transmission of a digital signal over a data link at a low-speed data rate or either 2.5 gigatransfers per second (GT/s) or 5.0 GT/s. Additionally, the PCIe 3.0 protocol specifies use of a 128b/130b encoding for transmission of a digital signal over a data link at a high-speed data rate of 8.0 GT/s. Moreover, the PCIe 3.0 protocol specifies a data rate change procedure for changing a data rate of a digital signal from the low-speed data rate to the high-speed data rate.

In this data rate change procedure, a link equalization procedure is performed on a data link of the PCIe fabric connected between two PCIe devices (i.e., an upstream component and a downstream component) to improve signal quality of the digital signal at the high-speed data rate. The upstream component initializes the link equalization procedure when the digital signal is being transmitted through the data link at the low-speed data rate. After the link equalization procedure is complete, the digital signal is transmitted through the data link at the high-speed data rate.

The link equalization procedure is performed in four distinct phases (Phase 0, Phase 1, Phase 2, and Phase 3) and includes both an upstream port equalization adjustment operation and a downstream port equalization adjustment operation. The upstream port equalization adjustment operation is performed to improve signal quality of a downstream digital signal transmitted through a data link from a downstream port of an upstream component to an upstream port of a downstream component. The downstream port equalization adjustment operation is performed to improve signal quality of an upstream digital signal transmitted through a data link from an upstream port of a downstream component to a downstream port of an upstream component.

The downstream port of the upstream component initiates Phase 0 of the link equalization procedure by entering into a recovery state and requesting a change in the data rate of the data link from a low-speed data rate to a high-speed data rate. In Phase 0 of the link equalization procedure, the downstream port of the upstream component transmits a Training Sequence Ordered Sets (EQ TS2 Ordered Sets) including a transmitter equalization setting and a receiver equalization setting to the upstream port of the downstream component through the data link. The transmitter equalization setting includes a transmitter preset value and the receiver equalization setting includes a receiver preset value (i.e., hint value).

The downstream port of the upstream component initiates Phase 1 of the link equalization procedure by transmitting a Training Sequence Ordered Set (TS1 Ordered Set) with an equalization control (EC) field set to one to the upstream port of the downstream component through the data link. In Phase 1 of the link equalization procedure, the downstream port of the upstream component and the upstream port of the downstream component exchange Training Sequence Ordered Sets (TS1 Ordered Sets) through the data link to establish a reliable operational link at the high-speed data rate. The reliable operational link has a bit-error rate (BER) of at least $10^{-4}$ (i.e., equal to or less than $10^{-4}$). In the process of establishing the reliable operational link, the upstream port of the downstream component may adjust the receiver setting of the upstream port based on the receiver equalization setting received from the downstream port of the upstream component. Moreover, the downstream port of the upstream component may adjust its receiver setting based on the receiver equalization setting.

The downstream port of the upstream component initiates Phase 2 of the link equalization procedure by transmitting Training Sequence Ordered Sets (TS1 Ordered Sets) with an equalization control (EC) field set to two to the upstream port of the downstream component through the data link. In Phase 2 of the link equalization procedure, the upstream port of the downstream component adjusts its receiver setting and requests the downstream port of the upstream component to adjust its transmitter setting. In this way, a downstream equalization adjustment is performed on the data link. The upstream port of the downstream component requests the downstream port of the upstream component to adjust its transmitter setting by transmitting Training Sequence Ordered Sets (TS1 Ordered Sets) including a transmitter equalization setting to the downstream port of the upstream component. In turn, the downstream port of the upstream component adjusts its transmitter setting based on the transmitter equalization setting.

The upstream port of the downstream component transitions from Phase 2 to Phase 3 of the link equalization procedure by transmitting Training Sequence Ordered Sets (TS1 Ordered Sets) with an equalization control (EC) field set to three to the downstream port of the upstream component. In response to receiving the TS1 Ordered sets with the equalization field set to three from the upstream port of the downstream component, the downstream port of the upstream component transitions from Phase 2 to Phase 3 of the link equalization procedure. In this way, the upstream port of the downstream component controls completion of Phase 2 of the link equalization procedure and controls transition from Phase 2 to Phase 3 of the link equalization procedure.

In Phase 3 of the link equalization procedure, the downstream port of the upstream component adjusts its receiver setting and requests the upstream port of the downstream component to adjust its transmitter setting. In this way, an upstream equalization adjustment is performed on the data link. The downstream port of the upstream component requests the upstream port of the downstream component to adjust its transmitter setting by transmitting Training Sequence Ordered Sets (TS1 Ordered Sets) including transmitter equalization settings to the upstream port of the downstream component. In turn, the upstream port of the downstream component adjusts its transmitter based on the transmitter equalization settings.

The downstream port of the upstream component signals a completion of Phase 3 of the link equalization procedure by transmitting TS1 Ordered Sets with an equalization control (EC) field set to zero to the upstream port of the downstream component. In response to receiving the TS1 Ordered sets with the equalization field set to zero from the downstream port of the upstream component, the upstream port of the downstream completes Phase 3. In this way, the downstream port of the upstream component controls completion of Phase 3 of the link equalization procedure.

The PCIe 3.0 Specification specifies a maximum time of 24 milliseconds (ms) for performing Phase 2 of the link equalization procedure. The PCIe 3.0 Specification also specifies that the downstream port of the upstream component (i.e., the non-controlling link partner) will timeout in Phase 2 if the upstream port of the downstream component (i.e., the controlling link partner) does not complete Phase 2 within 32 ms of initiating Phase 2. Similarly, the PCIe 3.0 Specification specifies a maximum time of 24 ms for performing Phase 3 of the link equalization procedure. The PCIe 3.0 Specification also specifies that the upstream port of the downstream component (i.e., the non-controlling link partner) will timeout in 32 ms if the downstream port of the upstream component (i.e., the controlling link partner) does not complete Phase 3 within 32 ms of initiating Phase 3.

In one embodiment of the evaluation process (i.e., a normal evaluation process), an evaluation is performed on each of the transmitter equalization settings with each of the receiver equalization settings by performing a continuous-time linear equalization (CTLE) and a decision feedback equalization (DFE) on a digital signal received on a data link. Moreover, the evaluation process includes selection of a combination of transmitter equalization setting and receiver equalization setting for optimizing the signal quality of a digital signal transmitted through the data link. In various embodiments, the evaluation of a transmitter equalization setting on each of the receiver equalization settings requires a period of about 2 ms in the evaluation process and the total time for performing the link equalization procedure is 24 ms. Because the evaluation process (i.e., normal evaluation process) requires a total time of about 24 ms, the evaluation process may be performed in Phase 2 or Phase 3 of the link equalization procedure. In Phase 2 of the link equalization procedure, the evaluation process may be performed leaving spare time period of 8 ms at the end of the Phase 2.

Embodiments of the Present Invention

In various embodiments, a data regeneration device of the present invention simultaneously performs an upstream link equalization procedure on an upstream data link in compliance with the PCIe 3.0 protocol and a downstream link equalization procedure on a downstream data link in compliance with the PCIe 3.0 protocol. In these embodiments, the data regeneration device performs a dual-delay interlocking operation to delay completion of Phase 2 of the upstream link equalization procedure until an upstream port equalization adjustment operation performed in Phase 3 of the downstream link equalization procedure is complete. Also in the dual-delay interlocking operation, the data regeneration device delays completion of Phase 3 of the downstream link equalization procedure until Phase 3 of the upstream link equalization procedure is complete. Performing the dual-delay interlocking operation allows the data regeneration device to synchronize completion of the upstream link equalization procedure with completion of the downstream link equalization procedure while maintaining compliance with the PCIe 3.0 protocol.

FIG. 1 illustrates a communication system 100 including a data regeneration device 110, in accordance with an embodiment of the present invention. The communication system 100 also includes upstream components 105 and downstream components 115. Each of the upstream components 105 is coupled (e.g., connected) to the data regeneration device 110 through a corresponding upstream data link 125. Each of the downstream components 115 is coupled (e.g., connected) to the data regeneration device 110 through a corresponding downstream data link 145. In some embodiments, the upstream data link 125 includes a number of data lanes, each of which transmits a portion of a digital signal between a corresponding upstream component 105 and the data regeneration device 110. In some embodiments, the downstream data link 145 includes a number of data lanes, each of which transmits a portion of a digital signal between and the data regeneration device 110 and a corresponding downstream component 115.

In various embodiments, each of the upstream components 105 and each of the downstream components 115 is a PCIe device compliant with a Peripheral Component Interconnect Express (PCIe) Base Specification Revision 3.0 maintained by the Peripheral Component Interconnect Special Interest Group (PCI-SIG) of Beaverton, Oreg. The PCIe Base Specification Revision 3.0 is incorporated herein by reference in its entirety. Moreover, the data regeneration device 110 communicates with each of the upstream components 105 and each of the downstream components 115 by using a protocol (i.e., PCIe 3.0 protocol) specified in the PCIe Base Specification Revision 3.0 (i.e., PCIe 3.0 Specification). As illustrated in FIG. 1, the data regeneration device 110 includes upstream ports 130, routing links 135, and downstream ports 140. Each of the upstream ports 130 is coupled (e.g., connected) to a corresponding upstream data link 125 and to a corresponding routing link 135. Each of the downstream ports 140 is coupled (e.g., connected) to a corresponding routing link 135 and to a corresponding downstream data link 145. In this way, an upstream port 130 corresponding to a routing link 135 is coupled to the downstream port 140 corresponding to the routing link 135. In various embodiments, the routing link 135 is a static routing link for routing symbols streams between the upstream port 130 corresponding to the routing link 135 and the downstream port 140 corresponding to the routing link 135 without performing a switching function.

Each of the upstream components 105 includes a downstream port 120 and each of the downstream components 115 includes an upstream port 150. The downstream port 120 of an upstream component 105 is coupled (e.g., connected) to a corresponding upstream port 130 of the data regeneration device 110 through the upstream data link 125 corresponding to the upstream port 130 of the data regeneration device 110. The upstream port 150 of a downstream component 115 is coupled (e.g., connected) to a corresponding downstream port 140 of the data regeneration device 110 through the downstream data link 145 corresponding to the downstream port 140 of the data regeneration device 110.

In operation, a downstream port 120 of an upstream component 105 generates a digital signal (i.e., a downstream digital signal) and transmits the digital signal through the upstream data link 125 corresponding to the upstream port 130 of the data regeneration device 110 corresponding to the upstream data link 125. In this way, the downstream port 120 of the upstream component 105 transmits the digital signal to the corresponding upstream port 130 of the data regeneration device 110. The upstream port 130 of the data regeneration device 110 receiving the digital signal generates a symbol stream based on the digital signal by converting serial data bits in the digital signal into symbols. In this way, the upstream port 130 of the data regeneration device 110 deserializes the serial data bits in the digital signal. Further, the upstream port 130 of the data regeneration device 110 generates the symbol stream including the symbols and routes the symbol stream through the corresponding routing link 135 to the downstream port 140 of the data regeneration device 110 corresponding to the routing link 135. In this way, the upstream port 130 of the data regeneration device 110 routes the symbol stream to the corresponding downstream port 140 of the data regeneration device 110.

The downstream port 140 of the data regeneration device 110 receiving the symbol stream from the corresponding upstream port 130 of the data regeneration device 110 through the corresponding routing link 135 converts the symbols in the symbol stream into serial data bits. In this way, the downstream port 140 of the data regeneration device 110 serializes the symbols in the symbol stream. Further, the downstream port 140 of the data regeneration device 110 generates a digital signal including the serial data bits and transmits the digital signal through the corresponding downstream data link 145 to the downstream component 115 corresponding to the downstream data link 145. In this way, the downstream port 140 of the data regeneration device 110 transmits the digital signal generated by the downstream port 140 of the data regeneration device 110 to the downstream component 115 corresponding to the downstream port 140 of the data regeneration device 110.

In some modes of operation, the digital signal generated by the downstream port 140 of the data regeneration device 110 includes the same serial data bits in the digital signal received by the corresponding upstream port 130 of the data regeneration device 110. In these modes of operation, the data regeneration device 110 regenerates the digital signal by transmitting the digital signal from the downstream port 140 of the data regeneration device 110 to the corresponding downstream data link 145. In this way, the data regeneration device 110 receives a digital signal on an upstream data link 125 and regenerates the digital signal on the corresponding downstream data link 145.

In some embodiments, the data regeneration device 110 modifies one or more data fields in the digital signal when regenerating the digital signal. For example, the downstream port 120 of the upstream component 105 may generate a Training Sequence Ordered Set (TS1 Ordered Set) containing a data field indicating a characteristic of the downstream port 120 of the upstream component 105 (e.g., a full-swing voltage value or a low-frequency value). The downstream port 120 of the upstream component 105 transmits the Training Sequence Ordered Set to the upstream port 130 of the data regeneration device 110. In turn, the upstream port 130 of the data regeneration device 110 uses the characteristic in the data field when making transmitter coefficient requests to the downstream port 120 of the upstream component 105 in Phase 2 of the upstream link equalization procedure. Further, the upstream port 130 of the data regeneration device 110 provides the Training Sequence Ordered Set to the corresponding downstream port 140 of the data regeneration device 110 through the corresponding routing link 135.

The downstream port 140 regenerates the digital signal by modifying the data field of the Training Sequence Ordered Set to indicate a characteristic of the downstream port 140 of the data regeneration device 110 (e.g., a full-swing voltage value or a low-frequency value). The downstream port 140 of the data regeneration device 110 transmits the Training Sequence Ordered Set including the modified data field to the upstream port 150 of the downstream component 115. In turn, the upstream port 150 of the downstream component 115 uses the characteristic in the data field when making transmitter coefficient requests to the downstream port 140 of the data regeneration device 110 in Phase 2 of the downstream link equalization procedure. In this example, the data regeneration device 110 substantially regenerates the digital signal received by the upstream port 130 of the data regeneration device 110 from the corresponding upstream data link 125 even though the data regeneration device 110 may modify one or more data fields in the digital signal received by the upstream port 130 of the data regeneration device 110.

Similarly, the data regeneration device 110 substantially regenerates a digital signal received by the downstream port 140 of the data regeneration device 110 from the corresponding downstream data link 145 even though the data regeneration device 110 may modify one or more data fields in the digital signal received at the downstream port 140 of the data regeneration device 110. For example, the upstream port 150 of the downstream component 115 may generate a Training Sequence Ordered Set (TS1 Ordered Set) containing a data field indicating a characteristic of the upstream port 150 of the downstream component 115 (e.g., a full-swing voltage value or a low-frequency value). The upstream port 150 of the downstream component 115 transmits the Training Sequence Ordered Set to the downstream port 140 of the data regeneration device 110. In turn, the downstream port 140 of the data regeneration device 110 uses the characteristic in the data field when making transmitter coefficient requests to the upstream port 150 of the downstream component 115 in Phase 3 of the downstream link equalization procedure. Further, the downstream port 140 of the data regeneration device 110 provides the Training Sequence Ordered Set to the corresponding upstream port 130 of the data regeneration device 110 through the corresponding routing link 135.

In this example, the upstream port 130 regenerates the digital signal by modifying the data field of the Training Sequence Ordered Set to indicate a characteristic of the upstream port 130 of the data regeneration device 110 (e.g., a full-swing voltage value or a low-frequency value). The upstream port 130 of the data regeneration device 110 transmits the Training Sequence Ordered Set including the modified data field to the downstream port 120 of the upstream component 105. In turn, the downstream port 120 of the upstream component 105 uses the characteristic in the data field when making transmitter coefficient requests to the upstream port 130 of the data regeneration device 110 in Phase 3 of the upstream link equalization procedure.

In some embodiments, the upstream port 130 of the data regeneration device 110 decodes the data symbols converted from the serial data bits. In these embodiments, the upstream port 130 of the data regeneration device 110 generates the symbol stream including the decoded data symbols. In addition to generating the symbol stream, the upstream port 130 of the data regeneration device 110 synchronizes data edges of data bits in the serial data stream received from the upstream data link 125 with a clock signal (CLK) 155. Moreover, the downstream port 140 of the data regeneration device 110 synchronizes data edges of data bits in the serial data stream generated by the downstream port 140 of the data regeneration device 110 with the clock signal 155.

In further operation, an upstream port 150 of a downstream component 115 generates a digital signal (i.e., an upstream digital signal) and transmits the digital signal through the corresponding downstream data link 145 to the downstream port 140 of the data regeneration device 110 corresponding to the downstream data link 145. In this way, the downstream component 115 transmits the digital signal to the corresponding downstream port 140 of data regeneration device 110. The downstream port 140 of the data regeneration device 110 receiving the digital signal generates a symbol stream based on the digital signal by converting serial data bits in the digital signal into symbols. In this way, the downstream port 140 of the data regeneration device 110 deserializes the serial data bits in the digital signal. Further, the downstream port 140 of the data regeneration device 110 generates the symbol stream including the symbols and routes the symbol stream through the corresponding routing link 135 to the upstream port 130 of the data regeneration device 110 corresponding to the routing link 135. In this way, the downstream port 140 of the data regeneration device 110 routes the symbol stream to the corresponding upstream port 130 of the data regeneration device 110.

The upstream port 130 of the data regeneration device 110 receiving the symbol stream from the corresponding downstream port 140 of the data regeneration device 110 through the corresponding routing link 135 converts the symbols in the symbol stream into serial data bits. In this way, the upstream port 130 of the data regeneration device 110 serializes the symbols in the symbol stream. Further, the upstream port 130 of the data regeneration device 110 generates a digital signal including the serial data bits and transmits the digital signal through the corresponding upstream data link 125 to the downstream port 120 of the upstream component 105 corresponding to the upstream data link 125. In this way, the upstream port 130 of the data regeneration device 110 transmits the digital signal to the corresponding downstream port 120 of the upstream component 105.

In some modes of operation, the digital signal generated by the upstream port 130 of the data regeneration device 110 includes the same serial data bits in the digital signal received by the downstream port 140 of the data regeneration device 110. In these modes of operation, the data regeneration device 110 regenerates the digital signal by transmitting the digital signal from the upstream port 130 of the data regeneration device 110 to the corresponding upstream data link 125. In this way, the data regeneration device 110 receives a digital signal on a downstream data link 145 and regenerates the digital signal on the corresponding upstream data link 125. In some embodiments, the data regeneration device 110 modifies one or more data fields in the digital signal when regeneration the digital signal, as is described more fully herein.

In some embodiments, the downstream port 140 of the data regeneration device 110 decodes the data symbols converted from the serial data bits. In these embodiments, the downstream port 140 of the data regeneration device 110 generates the symbol stream including the decoded data symbols. In addition to generating the symbol stream, the downstream port 140 of the data regeneration device 110 synchronizes data edges of data bits in the serial data stream received from the downstream data link 145 with the clock signal 155.

Moreover, the upstream port 130 of the data regeneration device 110 synchronizes data edges of data bits in the serial data stream generated by the upstream port 130 of the data regeneration device 110 with the clock signal 155.

In a low-speed pass-through mode of operation, the data regeneration device 110 receives a digital signal at a low-speed data rate of less than 8.0 gigatransfers per second (GT/s) and regenerates the digital signal at the same low-speed data rate. For example, the low-speed data rate may be 2.5 GT/s or 5.0 GT/s. In a high-speed pass-through mode of operation, the data regeneration device 110 receives a digital signal at a high-speed data rate of 8.0 GT/s and regenerates the digital signal at the same high-speed data rate. For example, a downstream port 140 of the data regeneration device 110 may receive a digital signal from a downstream data link 145 at a given data rate (e.g., a low-speed data rate or a high-speed data rate) and regenerate the digital signal on a corresponding upstream data link 125 at the same data rate. As another example, an upstream port 130 of the data regeneration device 110 may receive the digital signal from an upstream data link 125 at a given data rate (e.g., a low-speed data rate or a high-speed data rate) and regenerate the digital signal on a corresponding downstream data link 145 at the same data rate.

In addition to the low-speed pass-through mode of operation and the high-speed pass-through mode of operation, the data regeneration device 110 performs a multilink equalization procedure in an equalization mode of operation. For example, the data regeneration device 110 may perform the multilink equalization procedure in response to a data rate change request received from a downstream port 120 of an upstream component 105 through an upstream data link 125 or in response to a data change request received from an upstream port 150 of a downstream component 115 through a downstream data link 145. In various embodiments, the data regeneration device 110 performs the multilink equalization procedure on an upstream data link 125 and a corresponding downstream data link 145 in response to a data rate change request for changing the data rate of digital signal transmitted through the upstream data link 125 and the downstream data link 145. For example, the data rate change request may be a request for changing the data rate of the digital signal from the low-speed data of less than 8.0 GT/s to the high-speed data rate of 8.0 GT/s.

In various embodiments, an upstream component 105 or a downstream component 115 generates a data change request when the data regeneration device 110 is operating in the low-speed pass-through mode of operation. In response to the data change request, the data regeneration device 110 transitions from the low-speed pass-through mode of operation to the equalization mode of operation in compliance with the PCIe 3.0 protocol. In this way, the data regeneration device 110 seamlessly transitions from the low-speed mode of operation to the equalization mode of operation.

In the equalization procedure, the data regeneration device 110 performs the multilink equalization procedure by performing an upstream link equalization procedure on an upstream data link 125 and performing a downstream link equalization procedure on a corresponding downstream data link 145. After performing the multilink equalization procedure, the data regeneration device 110 transitions from the equalization mode of operation to the high-speed mode of operation in compliance with the PCIe 3.0 protocol. In this way, the data regeneration device 110 seamlessly transitions from the equalization mode of operation to the high-speed pass-through mode of operation. By performing the multilink equalization procedure, the data regeneration device 110 improves signal quality of the digital signal in the high-speed mode of operation.

In the multilink equalization procedure, the data regeneration device 110 performs four phases (Phase 0, Phase 1, Phase 2, and Phase 3) of the link equalization procedure specified in the PCIe 3.0 Specification by performing an upstream link equalization procedure on the upstream data link 125 and performing a downstream link equalization procedure on the downstream data link 145. The data regeneration device 110 performs the four phases of the link equalization procedure in both the upstream link equalization procedure and the downstream link equalization procedure in compliance with the PCIe 3.0 protocol. Moreover, the data regeneration device 110 performs a dual-delay interlocking operation in the multilink equalization procedure to delay completion of Phase 2 of the upstream link equalization procedure with completion of an upstream port equalization adjustment operation performed in Phase 3 of the downstream link equalization procedure, as is described more fully herein. Also in the dual-delay interlocking operation, the data regeneration device 110 delays completion of Phase 3 of the downstream link equalization procedure until Phase 3 of the upstream equalization link procedure is complete so that the data regeneration device 110 is capable of transitioning seamlessly from the equalization mode of operation to the high-speed pass-through mode of operation.

It is to be appreciated that delaying completion of Phase 2 of the upstream link equalization procedure with completion of the upstream port equalization adjustment operation performed in Phase 3 of the downstream link equalization procedure allows the data regeneration device 110 to synchronize completion of the upstream link equalization procedure with the downstream link equalization procedure. Moreover, the data regeneration device performs an accelerated equalization procedure in the downstream port equalization adjustment operation performed in Phase 3 of the downstream link equalization procedure so that the time for performing Phase 2 of the upstream link equalization procedure does not exceed a maximum time period of the PCIe 3.0 protocol, as is described more fully herein. Because the data regeneration device 110 completes the downstream port equalization adjustment operation in Phase 3 of the downstream link equalization procedure before starting Phase 3 of the upstream link equalization procedure, the data regeneration device 110 is capable of transitioning from the equalization mode of operation to the high-speed pass through mode of operation seamlessly after Phase 3 of the upstream link equalization procedure is complete. Furthermore, because the data regeneration device 110 delays completion of Phase 3 of the downstream link equalization procedure until Phase 3 of the upstream link equalization procedure is complete, the data regeneration device 110 avoids a race condition in which the downstream link equalization procedure completes before the upstream link equalization procedure completes.

In the transition from the equalization mode of operation to the high-speed pass-through mode of operation, the upstream port 130 of the data regeneration device 110 receives a high-speed data signal upon completion of Phase 3 of the upstream link equalization procedure in compliance with the PCIe 3.0 protocol. Moreover, the downstream port 140 of the data regeneration device 110 regenerates the high-speed data signal upon completion of Phase 3 of the downstream link equalization procedure in compliance with the PCIe 3.0 protocol. In this way, the data regeneration device 110 transitions seamlessly from the equalization mode of operation to the high-speed pass-through mode of operation.

Upstream Link Equalization Procedure

In Phase 0 of the upstream link equalization procedure, a downstream port 120 of an upstream component 105 transmits upstream link equalization settings to the corresponding upstream port 130 of the data regeneration device 110 through the corresponding upstream data link 125. The upstream link equalization settings include a transmitter equalization setting and a receiver equalization setting to be used in phase 1 of the upstream link equalization procedure. The transmitter equalization setting includes a transmitter preset value, which indicates a de-emphasis value and a preshoot value for modifying a shape of a digital signal transmitted (e.g., regenerated) through the upstream data link 125. The receiver equalization setting includes a receiver preset value (i.e., hint value), which indicates a value for modifying a shape of a digital signal received through the upstream data link 125.

In Phase 1 of the upstream link equalization procedure, the downstream port 120 of the upstream component 105 and the upstream port 130 of the data regeneration device 110 communicate through the corresponding upstream data link 125 to establish a reliable operational link at the high-speed data rate. The operational link has a bit-error rate (BER) that is better than $10^{-4}$ (i.e., equal to or less than $10^{-4}$). In the process of establishing the reliable operational link, the upstream port 130 of the data regeneration device 110 may adjust its receiver setting based on the receiver equalization setting received from the downstream port 120 of the upstream component 105. In this way, the upstream port 130 of the data regeneration device 110 equalizes its receiver based on the receiver equalization setting received from the downstream port 120 of the upstream component 105 to improve signal quality of a digital signal received by the upstream port 130 of the data regeneration device 110 through the upstream data link 125. The receiver of the upstream port 130 of the data regeneration device 110 improves the signal quality of the digital signal by modifying the shape of the digital signal received from the upstream data link 125 based on the receiver equalization setting. Moreover, the downstream port 120 of the upstream component 105 may adjust its receiver setting based on the receiver equalization settings.

In Phase 2 of the upstream link equalization procedure, upstream port 130 of the data regeneration device 110 adjusts its receiver setting and requests the downstream port 120 of the upstream component 105 to adjust its transmitter setting. In this process, the upstream port 130 of the data regeneration device 110 transmits Training Sequence Ordered Sets (TS1 Ordered Sets) including transmitter equalization settings to the downstream port 120 of the upstream component 105. Each of the transmitter equalization settings includes a transmitter preset value or a transmitter coefficient value.

The downstream port 120 of the upstream component 105 adjusts its transmitter setting based on the transmitter equalization settings and transmits a digital signal including Training Sequence Ordered Sets (TS1 Ordered Sets) to the upstream port 130 of the data regeneration device 110 through the upstream data link 125. In turn, the upstream port 130 of the data regeneration device 110 performs an evaluation process on the transmitter equalization settings by determining an eye opening of an equalized eye for the digital signal. As described more fully herein, the evaluation process includes performing a continuous-time linear equalization (CTLE) and a decision feedback equalization (DFE) on the digital signal to determine a signal quality of the digital signal. In Phase 2 of the upstream link equalization procedure, the upstream port 130 of the data regeneration device 110 performs the evaluation process on the digital signal including the Training Sequence Ordered Sets received from the downstream port 120 of the upstream component 105 through the upstream data link 125.

In some embodiments of the evaluation process, the upstream port 130 of the data regeneration device 110 evaluates the transmitter equalization settings of the upstream data link 125 by evaluating each of ten transmitter preset values of the downstream port 120 with each of the seven receiver preset values (i.e., hint values). Further, the upstream port 130 of the data regeneration device 110 selects one of the transmitter equalization settings of the upstream data link 125 providing a highest signal quality for the digital signal received by upstream port 130 of the data regeneration device 110 through the upstream data link 125.

The downstream port 120 of the upstream component 105 sets its transmitter setting to the selected transmitter equalization setting and the upstream port 130 of the data regeneration device 110 adjusts its receiver setting based on the digital signal received from the downstream port 120 of the upstream component 105. In this way, the data regeneration device 110 performs an upstream port equalization adjustment operation on the upstream data link 125. Moreover, the upstream port 130 of the data regeneration device 110 performs the evaluation process in a time period that is less than a maximum specified time period for performing Phase 2 in compliance with the PCIe 3.0 Specification. In some embodiments, the data regeneration device 110 performs the standard evaluation process within 24 ms, which is within the maximum time of 24 ms for performing Phase 2 of a link equalization procedure in the PCIe 3.0 protocol.

In Phase 3 of the upstream link equalization procedure, the downstream port 120 of the upstream component 105 adjusts its receiver setting and requests the upstream port 130 of the data regeneration device 110 to adjust its transmitter setting. In this process, the downstream port 120 of the upstream component transmits Training Sequence Ordered Sets (TS1 Ordered Sets) including a number of transmitter equalization settings to the upstream port 130 of the data regeneration device 110. Each of the transmitter equalization settings includes a transmitter preset value or a transmitter coefficient value.

The upstream port 130 of the data regeneration device 110 adjusts its transmitter setting based on the transmitter equalization settings and transmits a digital signal including Training Sequence Ordered Sets (TS1 Ordered Sets) to the downstream port 120 of the upstream component 105 through the upstream data link 125. In turn, the downstream port 120 of the upstream component 105 evaluates the transmitter equalization settings by performing an evaluation process on the transmitter equalization settings. In various embodiments, the evaluation process includes performing a continuous-time linear equalization (CTLE) and a decision feedback equalization (DFE) on the digital signal to determine a signal quality of the digital signal, as is described more fully herein. In Phase 3 of the upstream link equalization procedure, the downstream port 120 of the upstream component 105 performs the evaluation process on the digital signal including the Training Sequence Ordered Sets (TS1 Ordered Sets) received from the upstream port 130 of the data regeneration device 110 through the upstream data link 125.

In various embodiments, the downstream port 120 of the upstream component 105 evaluates transmitter equalization settings of the upstream data link 125 by evaluating transmitter settings (i.e., transmitter preset values or transmitter coefficient values) of the upstream port 130 of the data regeneration device 110. Further, the downstream port 120 of the upstream component 105 selects one of the transmitter equalization settings of the upstream data link 125 based on the signal quality of the digital signal received by downstream port 120 of the upstream component 105 through the upstream data link 125.

The downstream port 120 of the upstream component 105 sets its transmitter setting to the transmitter preset value or transmitter coefficient value of the selected transmitter equalization setting and the upstream port 130 of the data regeneration device 110 adjusts its receiver setting based on the digital signal received from the downstream port 120 of the upstream component 105. In this way, the data regeneration device 110 performs a downstream port equalization adjustment operation on the upstream data link 125. Moreover, the downstream port 120 of the upstream component 105 performs the evaluation process within a time period for performing Phase 3 in compliance with the PCIe 3.0 Specification. In various embodiments, the downstream port 120 of the upstream component 105 performs the evaluation process within 24 ms, which is within the maximum time of 24 ms for performing Phase 3 of a link equalization procedure in the PCIe 3.0 protocol.

Downstream Link Equalization Procedure

In Phase 0 of the downstream link equalization procedure, the downstream port 140 of the data regeneration device 110 corresponding to the upstream port 130 of the data regeneration device 110 transmits downstream link equalization settings to the upstream port 150 of the downstream component 115 corresponding to the downstream port 140 of the data regeneration device 110 through the corresponding downstream data link 145. The downstream equalization settings include a transmitter equalization setting and a receiver equalization setting to be used in Phase 1 of the downstream link equalization procedure. The transmitter equalization settings include a transmitter preset value, which indicates a de-emphasis value and a preshoot value for modifying a shape of a digital signal transmitted (e.g., regenerated) through the downstream data link 145. The receiver equalization setting includes a receiver preset value (i.e., hint value), which indicates a value for modifying a shape of a digital signal received through the downstream data link 145.

In Phase 1 of the downstream link equalization procedure, the downstream port 140 of the data regeneration device 110 and the upstream port 150 of the downstream component 115 communicate through the corresponding downstream data link 145 to establish a reliable operational link at the high-speed data rate. The operational link has a bit-error rate (BER) that is better than $10^{-4}$ (i.e., equal to or less than $10^{-4}$). In the process of establishing the reliable operational link, the upstream port 150 of the downstream component 115 may adjust a receiver setting of the upstream port 150 based on the receiver equalization setting received from the downstream port 140 of the data regeneration device 110. In this way, the upstream port 150 equalizes a receiver of the upstream port 150 based on the receiver equalization setting received from the downstream port 140 of the data regeneration device 110 to improve signal quality of a digital signal received by the upstream port 150 through the downstream data link 145. The receiver of the upstream port 150 improves the signal quality of the digital signal by modifying the shape of the digital signal received from the upstream data link 125 based on the receiver equalization setting.

In Phase 2 of the downstream link equalization procedure, the upstream port 150 of the downstream component 115 adjusts its receiver setting and requests the downstream port 140 of the data regeneration device 110 to adjust its transmitter setting. In this process, the downstream port 140 of the data regeneration device 110 receives Training Sequence Ordered Sets (TS1 Ordered Sets) including a transmitter equalization setting from the upstream port 150 of the downstream component 115. The transmitter equalization setting includes a transmitter preset value or a transmitter coefficient value.

The data regeneration device 110 adjusts a transmitter setting of the downstream port 140 of the data regeneration device 110 based on the transmitter equalization setting and transmits Training Sequence Ordered Sets to the upstream port 150 of the downstream component 115. In turn, the upstream port 150 of the downstream component 115 evaluates the transmitter equalization setting by performing an evaluation process based on the transmitter equalization setting. In various embodiments, the evaluation process includes performing a continuous-time linear equalization (CTLE) and a decision feedback equalization (DFE) on a digital signal generated based on the transmitter equalization setting to determine a signal quality of the digital signal, as is described more fully herein. In Phase 2 of the downstream link equalization procedure, the upstream port 150 of the downstream component 115 performs the equalization procedure on the digital signal including the Training Sequence Ordered Sets received from the downstream port 140 of the data regeneration device 110 through the downstream data link 145.

In some embodiments of the evaluation process, the upstream port 150 of the downstream component 115 evaluates the transmitter equalization settings of the downstream data link 145 by evaluating each transmitter preset value or transmitter coefficient value of the downstream port 140. Further, the upstream port 150 of the downstream component 115 selects one of the transmitter equalization settings of the downstream data link 145 based on the signal quality of the digital signal received by upstream port 150 through the downstream data link 145.

The downstream port 140 of the data regeneration device 110 sets its transmitter setting to the selected transmitter equalization setting and the upstream port 150 of the downstream component 115 adjusts its receiver setting based on the digital signal received from the downstream port 140 of the data regeneration device 110. In this way, the downstream component 110 performs a downstream equalization adjustment of the downstream data link 145 for Phase 2 of the downstream link equalization procedure. In various embodiments, the upstream port 150 of the downstream component 115 performs the evaluation process in a time period that is less than a maximum specified time period for performing Phase 2 in compliance with the PCIe 3.0 Specification. In some embodiments, the upstream port 150 of the downstream component 115 performs the evaluation process within 24 ms, which is within the maximum time of 24 ms for performing Phase 2 of a link equalization procedure in the PCIe 3.0 protocol.

In Phase 3 of the downstream link equalization procedure, the downstream port 140 of the data regeneration device 110 adjusts its receiver setting and requests the upstream port 150 of the downstream component 115 to adjust its transmitter setting. In this process, the downstream port 140 of the data regeneration device 110 transmits Training Sequence Ordered Sets (TS1 Ordered Sets) including transmitter equalization settings to the upstream port 150 of the downstream component 115. Each of the transmitter equalization settings includes a transmitter preset value or a transmitter coefficient value.

The upstream port 150 of the downstream component 115 adjusts its transmitter setting based on the transmitter equalization settings and transmits a digital signal including Training Sequence Ordered Sets (TS1 Ordered Sets) to the downstream port 140 of the data regeneration device 110. In turn, the downstream port 140 of the data regeneration device 110 evaluates the transmitter equalization settings by performing an evaluation process on the transmitter equalization settings. The evaluation process includes performing a continuous-time linear equalization (CTLE) and a decision feedback equalization (DFE) on the digital signal to determine a signal quality of the digital signal. In Phase 3 of the upstream link equalization procedure, the downstream port 140 of the data regeneration device 110 performs the evaluation process on the digital signal including the Training Sequence Ordered Sets received from the upstream port 150 of the downstream component 115 through the downstream data link 145.

The upstream port 150 of the downstream component 115 sets the transmitter setting of the upstream port 150 to the selected transmitter equalization setting and the downstream port 140 of the data regeneration device 110 adjusts its receiver setting based on the digital signal received from the upstream port 150 of the downstream component 115. In this way, the data regeneration device 110 performs a downstream equalization adjustment on the downstream data link 145. Moreover, the downstream port 140 of the data regeneration device 110 performs the evaluation process within a time period for performing Phase 3 in compliance with the PCIe 3.0 Specification. In various embodiments, the downstream port 140 of the data regeneration device 110 performs the evaluation process within 24 ms, which is within the maximum time of 24 ms for performing Phase 3 of a link equalization procedure in the PCIe 3.0 protocol.

In some embodiments, the data regeneration device performs an accelerated evaluation process. In the accelerated evaluation process, the data regeneration device 110 performs a coarse evaluation operation and a fine evaluation operation on the digital signal received from a data link (i.e., an upstream data link 125 or a downstream data link 145). In the coarse evaluation operation, the data regeneration device 110 (e.g., upstream port 130 or downstream port 140) performs a continuous-time linear equalization (CTLE) on the digital signal received through the data link for each transmitter equalization setting and each receiver equalization setting, and selects one of the transmitter equalization settings (e.g., one of ten transmitter preset settings) providing a highest signal quality for the digital signal received by the data regeneration device 110 (e.g., upstream port 130 or downstream port 140) through the data link (e.g., upstream data link 125 or downstream data link 145).

In the fine evaluation operation performed on the digital signal, the data regeneration device 110 performs both a continuous-time linear equalization (CTLE) and a decision feedback equalization (DFE) on the digital signal for each combination of the transmitter equalization setting and each receiver equalization setting. Further, the data regeneration device 110 (e.g., upstream port 130 or downstream port 140) selects a combination of transmitter equalization setting and receiver equalization providing a highest signal quality for the digital signal received by the data regeneration device 110 through the data link (e.g., upstream data link 125 or downstream data link 145).

In various embodiments, the data regeneration device 110 performs the evaluation of a transmitter preset value with each of the receiver equalization settings in about 0.1 ms in the coarse evaluation operation. Because the downstream port 120 performs the coarse evaluation operation on the digital signal for ten transmitter equalization settings in these embodiments, the data regeneration device 110 performs the coarse evaluation on the digital signal in about 1 ms the accelerated evaluation process. Additionally, the data regeneration device 110 performs the evaluation of the selected transmitter equalization setting with each of the receiver equalization settings in about 2 ms in the accelerated evaluation process. Accordingly, the data regeneration device 110 performs the accelerated evaluation process in about 3 ms in the accelerated evaluation process (i.e., 1 ms for the coarse evaluation and 2 ms for the fine evaluation).

Dual-Delay Interlocking Operation

In various embodiments, the data regeneration device 110 performs a multilink equalization procedure by performing an upstream link equalization procedure on an upstream data link 125 while performing a downstream link equalization procedure on a corresponding downstream data link 145. In the equalization procedure, the data regeneration device 110 performs a dual-delay interlocking operation to delay completion of Phase 2 of the upstream link equalization procedure until the upstream port adjustment operation performed in Phase 3 of the downstream link equalization procedure is complete. The data regeneration device 110 advantageously performs the accelerated evaluation process in Phase 3 of the downstream link equalization procedure during Phase 2 of the upstream link equalization procedure so that the time for performing Phase 2 of the upstream link equalization procedure does not violate a maximum time according to the PCIe 3.0 protocol. Also in the dual-delay interlocking operation, the data regeneration device 110 delays completion of Phase 3 of the downstream link equalization procedure until Phase 3 of the upstream link equalization procedure is complete. Furthermore, because the data regeneration device 110 delays completion of Phase 3 of the downstream link equalization procedure until Phase 3 of the upstream link equalization procedure is complete, the data regeneration device 110 avoids a race condition in which the downstream link equalization procedure completes before the upstream link equalization procedure completes. Performing the dual-delay interlocking operation allows the data regeneration device 110 to synchronize completion of the upstream link equalization procedure with completion of the downstream link equalization procedure so that the data regeneration device 110 transitions seamlessly from the equalization mode to the high-speed pass-through mode, as is described more fully herein.

In various embodiments, the data regeneration device 110 performs a portion of the PCIe 3.0 protocol for performing the multilink equalization procedure but does not perform the entire PCIe 3.0 protocol. Although the data regeneration device 110 device does not perform the entire PCIe 3.0 protocol, the data regeneration device regenerates a digital signal and performs the multilink equalization operation in compliance with the PCIe 3.0 protocol. For example, the data regeneration device 110 may regenerate a digital signal between an upstream component 105 and a downstream component 115 in a pass-through mode of operation in which the upstream component 105 and the downstream component 115 perform the entire PCIe protocol. In this example, the portion of the PCIe 3.0 protocol performed by the data regeneration device 110 includes termination of the PCIe 3.0 link equalization procedure in the stream link equalization procedure and the downstream link equalization procedure.

In various embodiments, the data regeneration device 110 performs a portion of the PCIe protocol by terminating a portion of the physical layer of the PCIe 3.0 protocol. In some embodiments, the portion of the physical layer terminated by the data regeneration device 110 is the link equalization procedure protocol. In these embodiments, the data regeneration device 110 need not terminate other portions of the physical layer of the PCIe 3.0 protocol. In some embodiments, the data regeneration device 110 does not terminate those portions of the physical layer of the PCIe 3.0 protocol other than the portion of the physical layer for terminating the link equalization procedure. In various embodiments, the data regeneration device 110 does not terminate the transaction layer, the data layer, or the link training layer of the PCIe 3.0 protocol, or some combination thereof.

In some embodiments, the data regeneration device 110 performs the accelerated evaluation process instead of performing the normal evaluation process in Phase 2 of the upstream link equalization procedure. In these embodiments, the data regeneration device 110 performs the accelerated evaluation process in the downstream port equalization adjustment operation of Phase 2 of the upstream link equalization procedure.

In various embodiments, the data regeneration device 110 is implemented in an integrated circuit of an integrated circuit device which may include an integrated circuit package containing the integrated circuit. In some embodiments, the data regeneration device 110 is implemented in a single integrated circuit die. In other embodiments, the data regeneration device 110 is implemented in more than one integrated circuit die of an integrated circuit device which may include a multichip package containing the integrated circuit die.

Figure 2:
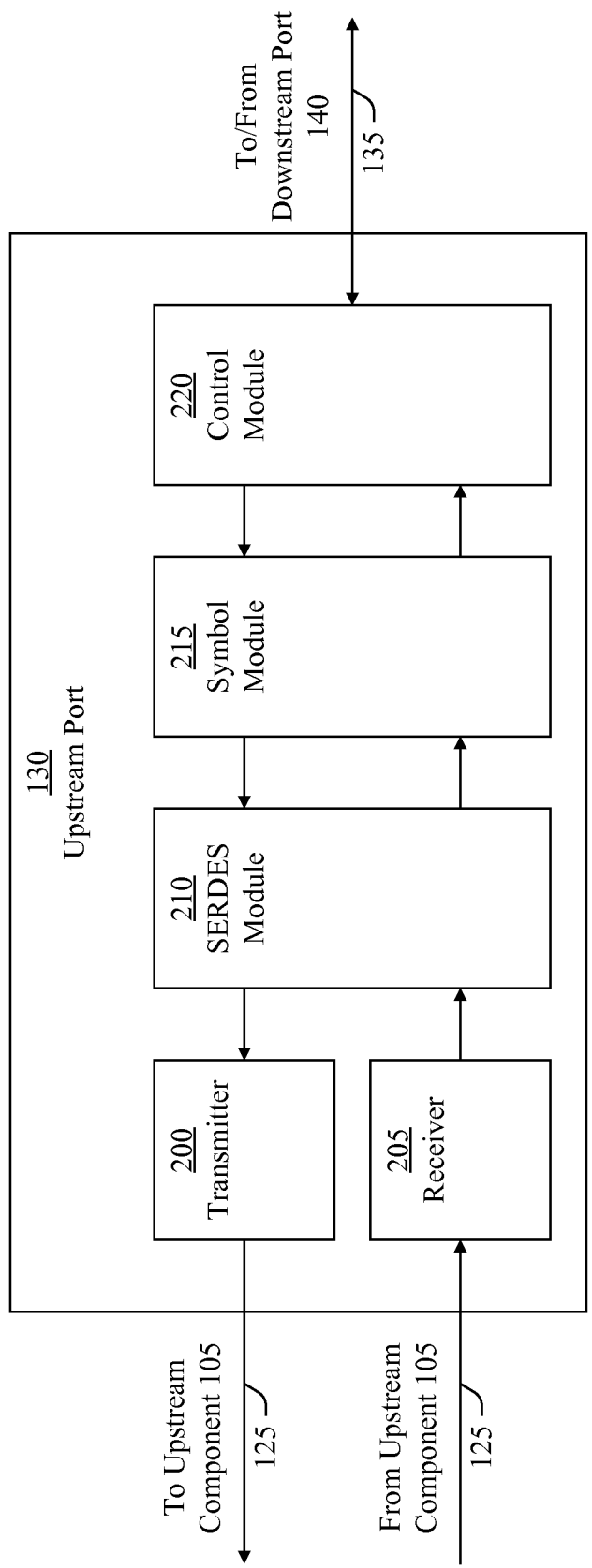
FIG. 2 is a block diagram of an upstream port of a data regeneration device, in accordance with an embodiment of the present invention.

FIG. 2 illustrates the upstream port 130 of the data regeneration device 110, in accordance with an embodiment of the present invention. The upstream port 130 includes a transmitter 200, a receiver 205, a serializer-deserializer module (SERDES module) 210, a symbol module 215, and a control module 220. The transmitter 200 and the receiver 205 are both coupled (e.g., connected) to the downstream port 120 of a corresponding upstream component 105 through the upstream data link 125 corresponding to the upstream component 105. Additionally, the transmitter 200 and the receiver 205 are both coupled (e.g., connected) to the serializer-deserializer module 210. The symbol module 215 is coupled (e.g., connected) to both the serializer-deserializer module 210 and the control module 220. The control module 220 is coupled (e.g., connected) to the downstream port 140 of the data regeneration device 110 corresponding to the upstream port 130 through the corresponding routing link 135.

In operation, the receiver 205 receives a digital signal from the downstream port 120 of the corresponding upstream component 105 through the corresponding upstream data link 125. The receiver 205 provides the digital signal received from the downstream port 120 to the serializer-deserializer module 210. The serializer-deserializer module 210 converts serial data bits in the digital signal received from the receiver 205 into symbols and generates a symbol stream including the symbols. In this way, the serializer-deserializer module 210 deserializes the serial data bits in the digital signal. The serializer-deserializer module 210 provides the symbol stream to the symbol module 215. The symbol module 215 decodes symbols in the symbol stream received from the serializer-deserializer module 210 and provides the symbol stream with the decoded symbols (i.e., a decoded symbol stream) to the control module 220.

In the pass-through modes of operation (i.e., low-speed pass-through mode and high-speed pass-through mode), the control module 220 provides the symbol stream received from the symbol module 215 to the downstream port 140 corresponding to the upstream port 130 through the corresponding routing link 135. In this way, the upstream port 130 passes the digital signal received on the upstream data link 125 to the routing link 135.

Also in the pass-through modes of operation, the control module 220 receives a symbol stream from the corresponding downstream port 140 through the corresponding routing link 135 and provides the symbol stream received from the downstream port 140 to the symbol module 215. The symbol module 215 encodes symbols in the symbol stream received from the control module 220 and provides the symbol stream with the encoded symbols (i.e., an encoded symbol stream) to the serializer-deserializer module 210. The serializer-deserializer module 210 converts symbols in the symbol stream received from the symbol module 215 into serial data bits and generates a digital signal including the serial data bits. In this way, the serializer-deserializer module 210 serializes symbols in the symbol stream. Further, the serializer-deserializer module 210 provides the digital signal to the transmitter 200. In turn, the transmitter 200 transmits the digital signal received from the serializer-deserializer module 210 to the downstream port 120 of the corresponding upstream component 105 through the corresponding upstream data link 125. In this way, the upstream port 130 passes a digital signal received on the routing link 135 to the upstream data link 125.

In the equalization mode of operation, the control module 220 controls operation of an upstream link equalization procedure performed on the upstream data link 125 based on the symbol stream received from the symbol module 215. In the upstream link equalization procedure, the control module 220 terminates the protocol of the symbol stream received from the symbol module 215. In this process, the control module 220 generates a symbol stream based on the symbol stream received from the symbol module 215 and provides the generated symbol stream to the symbol module 215. The symbol module 215 encodes symbols in the symbol stream received from the control module 220 and provides the symbol stream with the encoded symbols (i.e., an encoded symbol stream) to the serializer-deserializer module 210. For example, the symbol stream may include Training Sequence Ordered Sets (e.g., TS1 Ordered Sets), Electrical Idle Exit Ordered Sets (EIEOS), or skip ordered sets.

The serializer-deserializer module 210 converts symbols in the symbol stream received from the symbol module 215 into serial data bits and generates a digital signal including the serial data bits. In this way, the serializer-deserializer 210 serializes symbols in the symbol stream. Further, the serializer-deserializer module 210 provides the digital signal to the transmitter 200. In turn, the transmitter 200 transmits the digital signal received from the serializer-deserializer module 210 to the downstream port 120 of the corresponding upstream component 105 through the corresponding upstream data link 125.

Also in the equalization mode of operation, the receiver 205 adjusts (i.e., modifies) a receiver setting of the receiver 205 in the upstream link equalization procedure, as is described more fully herein. Additionally, the transmitter 200 adjusts (i.e., modifies) a transmitter setting of the transmitter 200 in the upstream link equalization procedure, as is also described more fully herein.

Figure 3:
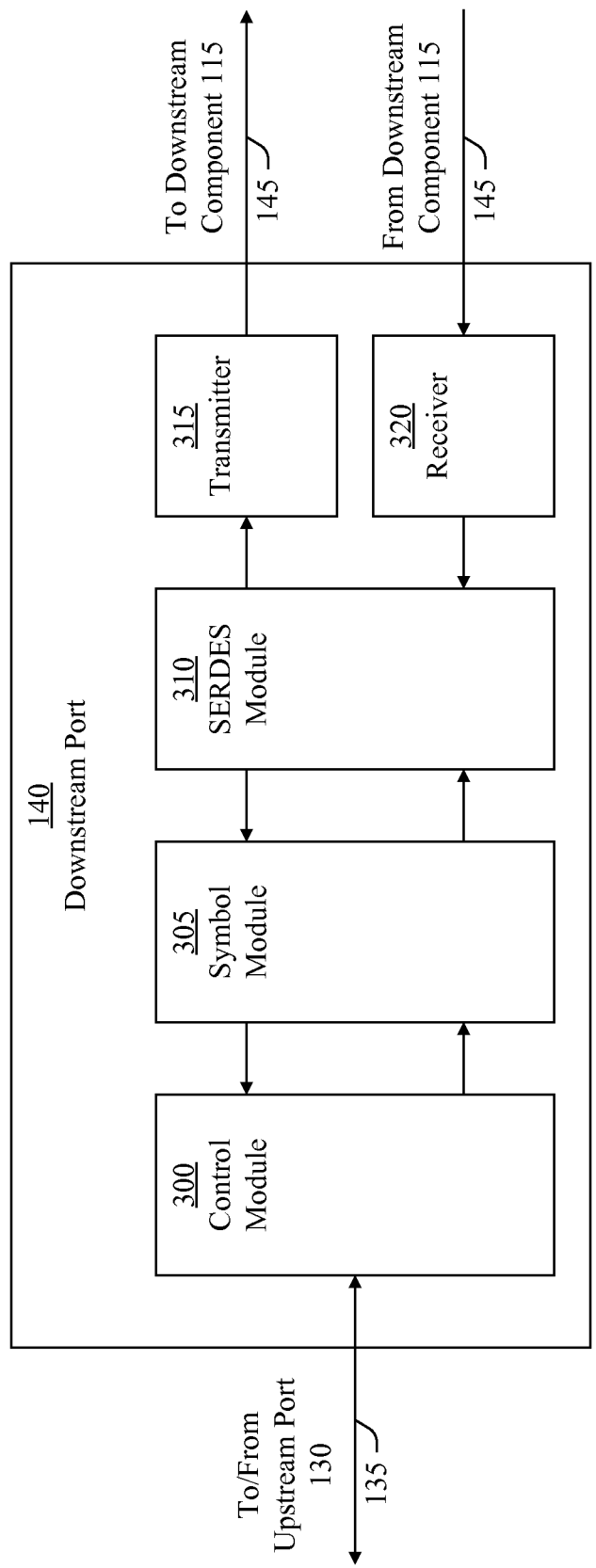
FIG. 3 is a block diagram of a downstream port of a data regeneration device, in accordance with an embodiment of the present invention.

FIG. 3 illustrates the downstream port 140 of the data regeneration device 110, in accordance with an embodiment of the present invention. The downstream port 140 includes a control module 300, a symbol module 305, a serializer-deserializer (SERDES) module 310, a transmitter 315, and a receiver 320. The control module 300 is coupled (e.g., connected) to the upstream port 130 of the data regeneration module 110 corresponding to the downstream port 140 through the corresponding routing link 135. The symbol module 305 is coupled (e.g., connected) to both the control module 300 and the serializer-deserializer module 310. The transmitter 315 and the receiver 320 are both coupled (e.g., connected) to the serializer-deserializer module 310. Additionally, the transmitter 315 and the receiver 320 are both coupled (e.g., connected) to the upstream port 150 of a corresponding downstream component 115 through the downstream data link 145 corresponding to the downstream component 115.

In operation, the receiver 320 receives a digital signal from the upstream port 150 of the corresponding downstream component 115 through the corresponding downstream data link 145. The receiver 320 provides the digital signal received from the upstream port 150 to the serializer-deserializer module 310. The serializer-deserializer module 310 converts serial data bits in the digital signal received from the receiver 320 into symbols and generates a symbol stream including the symbols. In this way, the serializer-deserializer module 310 deserializes the serial data bits in the digital signal. The serializer-deserializer module 310 provides the symbol stream to the symbol module 305. The symbol module 305 decodes symbols in the symbol stream received from the serializer-deserializer module 310 and provides the symbol stream with the decoded symbols (i.e., a decoded symbol stream) to the control module 300.

In the pass-through modes of operation (i.e., low-speed pass-through mode and high-speed pass-through mode), the control module 300 provides the symbol stream received from the symbol module 305 to the upstream port 130 corresponding to the downstream port 140 through the corresponding routing link 135. In this way, the downstream port 140 passes the digital signal received on the downstream data link 145 to the routing link 135.

Also in the pass-through modes of operation, the control module 300 receives a symbol stream from the corresponding upstream port 130 through the corresponding routing link 135 and provides the symbol stream received from the upstream port 130 to the symbol module 305. The symbol module 305 encodes symbols in the symbol stream received from the control module 300 and provides the symbol stream with the encoded symbols (i.e., an encoded symbol stream) to the serializer-deserializer module 310. The serializer-deserializer module 310 converts symbols in the symbol stream received from the symbol module 305 into serial data bits and generates a digital signal including the serial data bits. In this way, the serializer-deserializer module 310 serializes symbols in the symbol stream. Further, the serializer-deserializer module 310 provides the digital signal to the transmitter 315. In turn, the transmitter 315 transmits the digital signal received from the serializer-deserializer module 310 to the upstream port 150 of the corresponding downstream component 115 through the corresponding downstream data link 145. In this way, the downstream port 140 passes a digital signal received on the routing link 135 to the downstream data link 145.

In the equalization mode of operation, the control module 300 controls operation of a downstream link equalization procedure performed on the downstream data link 145 based on the symbol stream received from the symbol module 305. In the downstream link equalization procedure, the control module 300 terminates the protocol of the symbol stream received from the symbol module 305. In this process, the control module 300 generates a symbol stream based on the symbol stream received from the symbol module 305 and provides the generated symbol stream to the symbol module 305. The symbol module 305 encodes symbols in the symbol stream received from the control module 300 and provides the symbol stream with the encoded symbols (i.e., an encoded symbol stream) to the serializer-deserializer module 310. For example, the symbol stream may include Training Sequence Ordered Sets (e.g., TS1 Ordered Sets), Electrical Idle Exit Ordered Sets (EIEOS), or skip ordered sets.

The serializer-deserializer module 310 converts symbols in the symbol stream received from the symbol module 305 into serial data bits and generates a digital signal including the serial data bits. In this way, the serializer-deserializer module 310 serializes symbols in the symbol stream. Further, the serializer-deserializer module 310 provides the digital signal to the transmitter 315. In turn, the transmitter 315 transmits the digital signal received from the serializer-deserializer module 310 to the upstream port 150 of the corresponding downstream component 115 through the corresponding downstream data link 145.

Also in the equalization mode of operation, the receiver 320 adjusts (i.e., modifies) a receiver setting of the receiver 320 in the downstream link equalization procedure, as is described more fully herein. Additionally, the transmitter 315 adjusts (i.e., modifies) a transmitter setting of the transmitter 315 in the downstream link equalization procedure, as is also described more fully herein.

In various embodiments, the control module 220 of an upstream port 130 communicates with the control module 300 of the downstream port 140 corresponding to the upstream port 130 through the corresponding routing link 135 to coordinate transition from the low-speed mode of operation to the equalization mode of operation and to coordinate transition from the equalization mode of operation to the high-speed mode of operation. Because the time for performing the upstream link equalization procedure on the upstream data link 125 may vary according to the PCIe 3.0 protocol and the time for performing the downstream link equalization procedure on the corresponding downstream data link 145 may vary according to the PCIe 3.0 protocol, the control module 220 of the upstream port 130 and the control module 300 of the downstream port 140 operate together to synchronize completion of the upstream link equalization procedure with completion of the downstream link equalization procedure. As a result, completion of the upstream link equalization procedure and completion of the downstream link equalization procedure occur at substantially the same time (e.g., in a same clock cycle of the clock signal 155).

After the control module 220 of the upstream port 130 and the control module 300 of the downstream port 140 synchronize completion of Phase 2 of the upstream link equalization procedure with completion of the upstream port equalization adjustment operation in Phase 3 of the downstream link equalization procedure, the control module 300 of the downstream port 140 enters into a wait state and the control module 220 of the upstream port 130 begins and completes Phase 3 of the upstream link equalization procedure. In this way, the control module 220 of the upstream port 130 controls the multilink equalization procedure in the equalization mode of operation once the completion of Phase 2 of the upstream link equalization procedure is synchronized with the completion of the upstream port equalization adjustment operation in Phase 3 of the downstream link equalization procedure.

Moreover, the control module 220 of the upstream port 130 controls the transition from the equalization mode to the high-speed pass-through at the completion of Phase 3 of the upstream link equalization procedure. In this process, the control module 220 of the upstream port 130 communicates with the control module 300 of the downstream port 140 through the routing link 145 to synchronize the completion of Phase 3 of the upstream link equalization procedure with the completion of Phase 3 of the downstream link equalization procedure and begin the high-speed pass through mode of operation. In various embodiments, the control module 220 of the upstream port 130 synchronizes completion of Phase 3 of the upstream link equalization procedure with completion of Phase 3 of the downstream link equalization procedure by transmitting TS1 Ordered Sets with an equalization control (EC) field set to zero to the control module 300 of the downstream port 140.

Because the control module 220 of the upstream port 130 controls the transition from the equalization mode to the high-speed pass-through at the completion of Phase 3 of the upstream link equalization procedure, the data regeneration device 110 is capable of transitioning from the equalization mode of operation to the high-speed mode of operation seamlessly without violating the PCIe 3.0 protocol. An example of a PCIe 3.0 protocol violation avoided by the data regeneration device 110 is exceeding the maximum time for performing Phase 2 and Phase 3 of a link equalization procedure (e.g., the upstream link equalization procedure or the downstream link equalization procedure).

Figure 4:
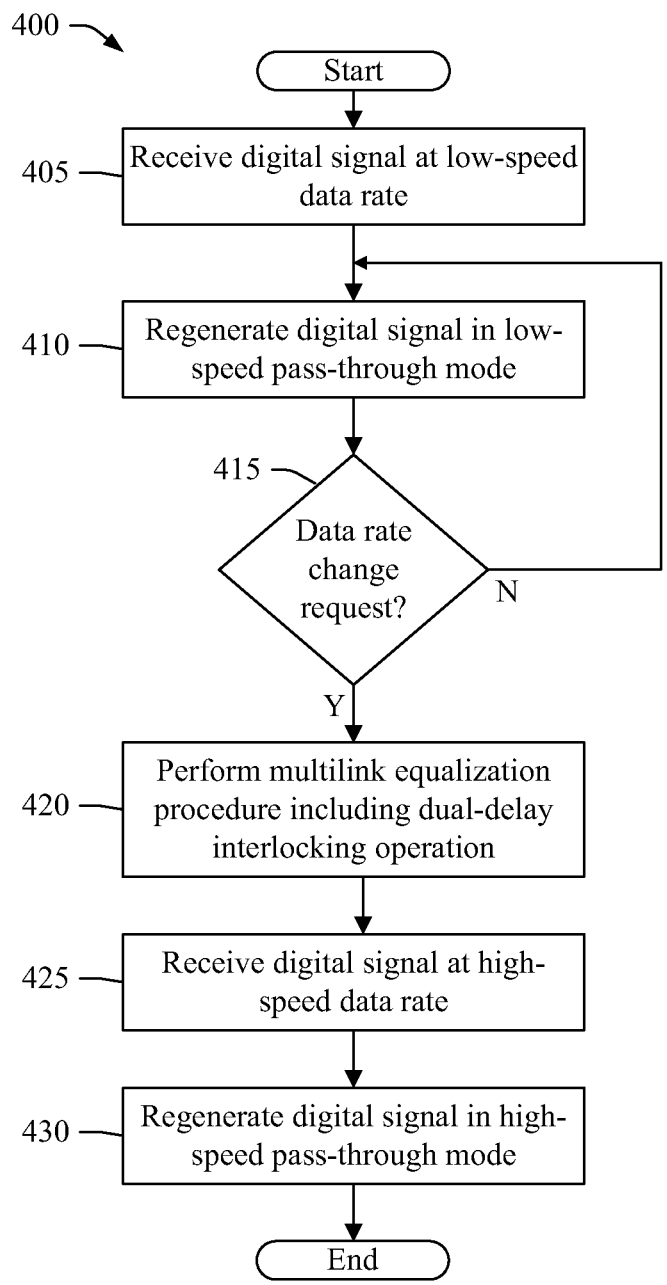
FIG. 4 is a flow chart for a method of regenerating a digital signal, in accordance with an embodiment of the present invention.

FIG. 4 illustrates a method 400 of regenerating a digital signal, in accordance with an embodiment of the present invention. As described below, the method 400 is performed on an upstream port 130 and a corresponding downstream port 140 of the data regeneration device 110. Moreover, the method 400 is performed on an upstream data link 125 corresponding to the upstream port 130 and on a downstream data link 145 corresponding to the downstream port 140.

In step 405, a data signal is received at a low-speed data rate. In various embodiments, the data regeneration device 110 receives the data signal at the low-speed data rate. For example, the downstream port 140 of the data regeneration device 110 may receive an upstream digital signal from the downstream data link 145. As another example, the upstream port 130 of the data regeneration device 110 may receive a downstream digital signal from the upstream data link 125. In various embodiments, the digital signal received by the data regeneration device 110 at the low-speed data rate is compliant with a PCIe 3.0 protocol. The method 400 then proceeds to step 410.

In step 410, the data signal is regenerated at the low-speed data rate. In various embodiments, the data regeneration device 110 regenerates the data signal at the low-speed data rate in a low-speed pass-through operation. In the low-speed pass-through mode of operation, the data regeneration device 110 transmits the digital signal from the data link (e.g., upstream data link 125 or downstream data link 145) on which the data regeneration device 110 received the digital signal to the corresponding data link (e.g., upstream data link 125 or downstream data link 145) at the low-speed data rate. In various embodiments, the digital signal regenerated by the data regeneration device 110 at the low-speed data rate is compliant with a PCIe 3.0 protocol. The method 400 then proceeds to step 415.

In step 415, it is determined whether a data change request occurs for changing the data rate of the digital signal from the low-speed data rate to a high-speed data rate. In various embodiments, the data regeneration device 110 determines a data change request occurs in response to receiving a data change request for changing the data rate of the digital signal from the low-speed data rate to a high-speed data rate. For example, the upstream port 130 of the data regeneration device 110 may receive the data change request on the upstream data link 125 from an upstream component 105. As another example, the downstream port 140 of the data regeneration device 110 may receive the data change request on the downstream data link 145 from a downstream component 115. If a data rate change request occurs, the method 400 proceeds to step 420. Otherwise, the method 400 returns to step 410.

In step 420, arrived at from the determination in step 415 that a data rate change request occurs, a multilink equalization procedure is performed which includes a dual-delay interlocking operation. In various embodiments, the data regeneration device 110 performs the multilink equalization procedure including the dual-delay interlocking operation in an equalization mode of operation. Moreover, the data regeneration device 110 transitions from the low-speed pass-through mode of operation to the equalization mode of operation seamlessly (i.e., in compliance with the PCIe 3.0 protocol).

The data regeneration device 110 performs the multilink equalization procedure on the data link on which the data regeneration device 110 received the digital signal at the low-speed data rate (e.g., upstream data link 125 or downstream data link 145) and the corresponding data link on which the data regeneration device 110 regenerated the digital signal (e.g., upstream data link 125 or downstream data link 145) at the low-speed data rate. In this way, the data regeneration device 110 performs the multilink equalization operation on both an upstream data link 125 and a corresponding downstream data link 145. Moreover, the data regeneration device 110 performs an upstream link equalization procedure on the upstream data link 125 and a downstream link equalization procedure on the downstream data link 145.

In the multilink equalization procedure, the data regeneration device 110 device performs the dual-delay interlocking operation to synchronize completion of the upstream link equalization procedure with completion of the downstream link equalization procedure. Performing the dual-delay interlocking operation allows the data regeneration device 110 to transition seamlessly from the equalization mode of operation to the high-speed mode of operation. The method 400 then proceeds to step 425.

In step 425, the digital signal is received at a high-speed data rate. In various embodiments, the data regeneration device 110 receives the digital signal at the high-speed data rate on the same data link (e.g., upstream data link 125 or downstream data link 145) on which the data regeneration device 110 received the digital signal at the low-speed data rate. In various embodiments, the digital signal received at the high-speed data rate is compliant with the PCIe 3.0 protocol. The method 400 then proceeds to step 430.

In step 430, the data signal is regenerated at the high-speed data rate. In various embodiments, the data regeneration device 110 regenerates the data signal at the high-speed data rate in a high-speed pass-through operation. Moreover, the data regeneration device 110 transitions from the equalization mode of operation to the high-speed pass-through mode of operation seamlessly (i.e., in compliance with the PCIe 3.0 protocol). In the high-speed pass-through mode of operation, the data regeneration device 110 transmits the digital signal from the data link (e.g., upstream data link 125 or downstream data link 145) on which the data regeneration device 110 received the digital signal to the corresponding data link (e.g., upstream data link 125 or downstream data link 145) at the high-speed data rate. The method 400 then ends.

In various embodiments, the method 400 illustrated in FIG. 4 may include more or fewer than the steps 405-430 illustrated in FIG. 4 and described above. In some embodiments, the steps 405-430 of the method 400 illustrated in FIG. 4 may be performed in a different order than the order illustrated in FIG. 4 and described above. In some embodiments, some of the steps 405-430 of the method 400 illustrated in FIG. 4 may be performed in parallel or substantially simultaneously. In various embodiments, one or more of the steps 405-430 may be performed more than once in the method 400 illustrated in FIG. 4.

Figure 5:
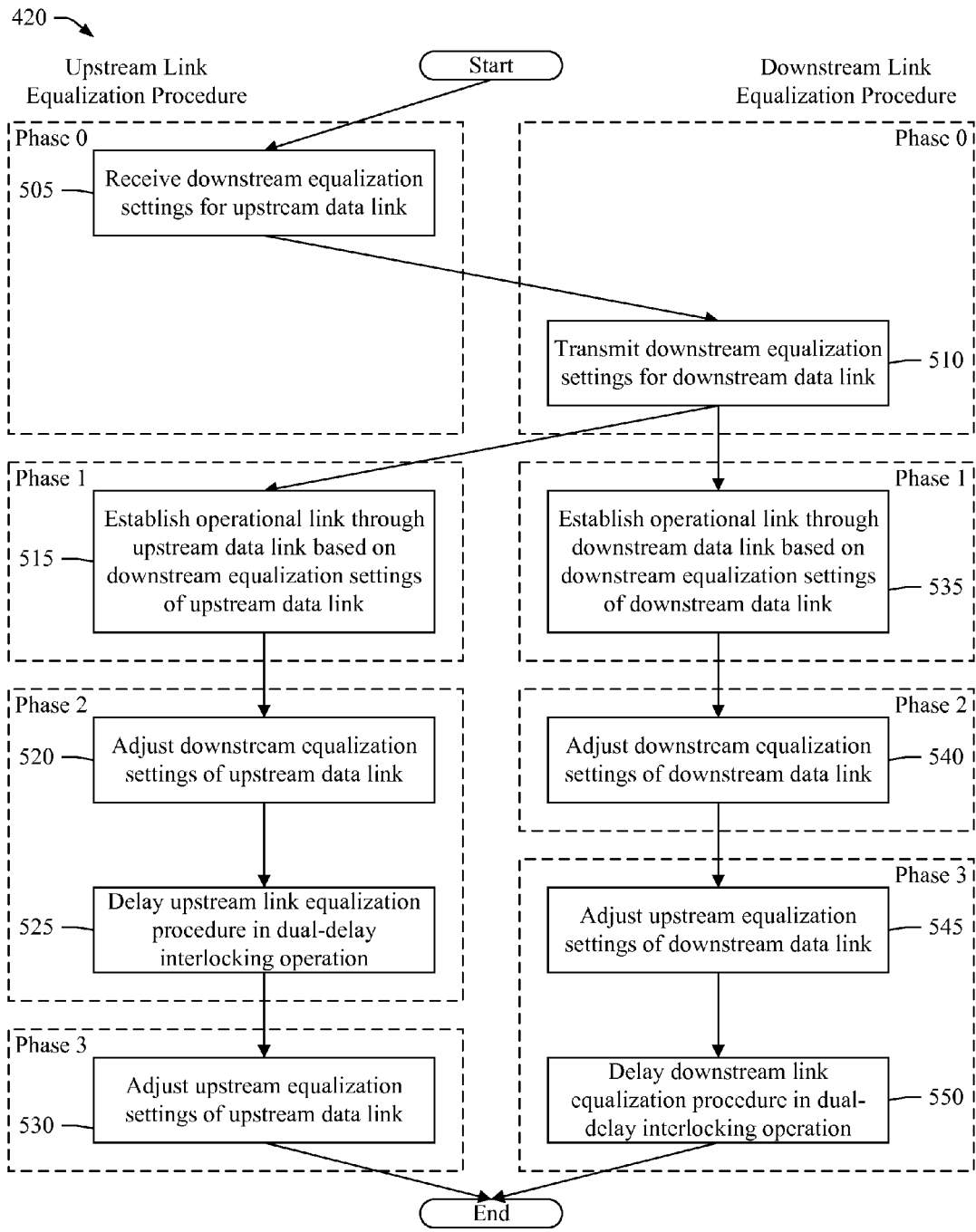
FIG. 5 is a flow chart for a portion of a method of regenerating a digital signal, in accordance with an embodiment of the present invention.

FIG. 5 illustrates a portion of the method 400 of regenerating the digital signal, in accordance with an embodiment of the present invention. The portion of the method 400 illustrated in FIG. 5 illustrates embodiments of step 420 of the method 400 illustrated in FIG. 4.

In step 505, downstream equalization settings for the upstream data link are received in Phase 0 of the upstream link equalization procedure. In various embodiments, the data regeneration device 110 receives the downstream equalization settings of the upstream data link 125 at the upstream port 130 of a data regeneration device 110 through the upstream data link 125. The downstream equalization settings of the upstream data link 125 include a transmitter equalization setting, which includes a transmitter preset value, and a receiver equalization setting, which includes a receiver preset value. The portion of the method 400 then proceeds to step 510.

In step 510, downstream equalization settings for the downstream data link are transmitted in Phase 0 of the downstream link equalization procedure. In various embodiments, the data regeneration device 110 transmits the downstream equalization settings of the downstream data link 145 from the downstream port 140 of the data regeneration device 110 to the downstream data link 145. The downstream equalization settings of the downstream data link 145 include a transmitter equalization setting, which includes a transmitter preset value, and a receiver equalization setting, which includes a receiver preset value. The portion of the method 400 then proceeds to both step 515 and step 535.

In step 515, arrived at from step 510 in which the downstream equalization settings for the downstream data link are transmitted in Phase 0 of the downstream link equalization procedure, an operational link is established through the upstream data link based on the downstream equalization settings of the upstream data link. In various embodiments, the upstream port 130 of the data regeneration device 110 communicates with the downstream port 120 of the upstream component 105 through the upstream data link 125 to establish a reliable operational link at the high-speed data rate through the upstream data link 125. In various embodiments, the operational link has a bit-error rate (BER) that is better than $10^{-4}$ (i.e., equal to or less than $10^{-4}$). In this way, the operational link is a reliable operational link. In the process of establishing the operational link, the upstream port 130 of the data regeneration device 110 may adjust a receiver setting of the upstream port 130 based on the receiver equalization settings of the downstream equalization settings for the upstream link equalization procedure. The portion of the method 400 then proceeds to step 520.

In step 520, the downstream equalization settings of the upstream data link are adjusted in Phase 2 of the upstream link equalization procedure. In various embodiments, the data regeneration device 110 adjusts the downstream equalization settings of the upstream data link 125 by adjusting the receiver setting of the upstream port 130 of the data regeneration device 110 based on the receiver equalization settings of the upstream data link 125 and adjusting the transmitter equalization settings of the downstream port 120 of the upstream component 105 based on the transmitter equalization settings of the upstream data link 125. In this process, the upstream port 130 of the data regeneration device 110 evaluates the downstream equalization settings of the upstream data link 125. In some embodiments, the upstream port 130 of the data regeneration device 110 evaluates the downstream equalization settings of the upstream data link 125 by performing the standard evaluation process specified in the PCIe 3.0 Specification, as is described more fully herein. In various embodiments, the data regeneration device 110 performs the standard evaluation process in less than 24 ms, which is less than the maximum time of 24 ms for performing Phase 2 of a link equalization procedure in the PCIe 3.0 protocol. The portion of the method 400 then proceeds to step 525.

In step 525, the upstream link equalization procedure is delayed in the dual-delay interlocking operation. In various embodiments, the data regeneration device 110 delays completion of Phase 2 of the upstream link equalization procedure until the upstream port adjustment operation performed in Phase 3 of the downstream link equalization procedure is complete. In this process, the upstream port 130 of the data regeneration device 110 waits during a spare time period at the end of Phase 2 of the upstream link equalization procedure for the upstream port adjustment operation performed in Phase 3 of the downstream link equalization procedure to complete.

In various embodiments, the upstream port 130 of the data regeneration device 110 receives a synchronization signal from the downstream port 140 of the data regeneration device 110 through the corresponding routing link 135 indicating that the downstream port adjustment operation performed in Phase 3 of the downstream link equalization procedure is complete. In this way, the data regeneration device 110 synchronizes completion of Phase 2 of the upstream link equalization procedure with completion of the downstream port adjustment operation performed in Phase 3 of the downstream link equalization procedure. The portion of the method 400 then proceeds to step 530.

In step 535, arrived at from step 510 in which downstream equalization settings for the downstream data link are transmitted in Phase 0 of the downstream link equalization procedure, an operational link is established through the downstream data link based on the downstream equalization settings of the downstream data link. In various embodiments, the downstream port 140 of the data regeneration device 110 communicates with the upstream port 150 of the downstream component 115 through the downstream data link 145 to establish a reliable operational link at the high-speed data rate through the downstream data link 145. In various embodiments, the operational link has a bit-error rate (BER) that is better than $10^{-4}$ (i.e., equal to or less than $10^{-4}$). In this way, the operational link is a reliable operational link. In the process of establishing the operational link, the downstream port 140 of the data regeneration device 110 may adjust a receiver setting of the downstream port 140 based on the receiver equalization settings of the downstream equalization settings for the downstream data link 145. The portion of the method 400 then proceeds to step 540.

In step 540, the downstream equalization settings of the downstream data link are adjusted in Phase 2 of the downstream link equalization procedure. In various embodiments, the downstream component 115 adjusts the downstream equalization settings of the downstream data link 145 by adjusting the receiver setting of the upstream port 150 of the of the downstream component 115 based on the receiver equalization settings of the downstream data link 145 and adjusting the transmitter setting of the downstream port 140 of the data regeneration device 110 based on the transmitter equalization settings of the downstream data link 145. In this process, the upstream port 150 of the downstream component 115 evaluates the downstream equalization settings of the downstream data link 145. In some embodiments, the upstream port 150 of the downstream component 115 evaluates the downstream equalization settings of the upstream link by performing an evaluation process, as is described more fully herein. In various embodiments, the data downstream component 115 performs the evaluation process in less than 24 ms, which is less than the maximum time of 24 ms for performing Phase 2 of a link equalization procedure in the PCIe 3.0 protocol. The portion of the method 400 then proceeds to step 545.

In step 545, the upstream equalization settings of the downstream data link are adjusted in Phase 3 of the downstream link equalization procedure. In various embodiments, the data regeneration device 110 adjusts the upstream equalization settings of the downstream data link 145 by adjusting the receiver setting of the downstream port 140 of the data regeneration 110 based on receiver equalization settings of the downstream data link 145 and adjusting the transmitter setting of the upstream port 150 of the downstream component 115 based on the transmitter equalization settings of the downstream data link 145. In this process, the downstream port 140 of the data regeneration device 110 evaluates the upstream equalization settings of the downstream data link 145.

In various embodiments, the downstream port 140 of the data regeneration device 110 evaluates the downstream equalization settings of the upstream data link 125 by performing the accelerated evaluation process, as is described more fully herein. In various embodiments, the data regeneration device 110 performs the accelerated evaluation process in 3 ms or less, which is less than the maximum time of 24 ms for performing Phase 3 of a link equalization procedure in the PCIe 3.0 protocol.

Also in step 545, the downstream port 140 of the data regeneration device 110 provides a synchronization signal to the upstream port 130 of the data regeneration device 110 through the corresponding routing link 135. The synchronization signal indicates that the adjustment of the upstream equalization settings of the downstream data link 145 in Phase 3 of the downstream link equalization procedure is complete. The portion of the method 400 then proceeds to step 550.

In step 550, the downstream link equalization procedure is delayed in the dual-delay equalization operation. In various embodiments, the data regeneration device 110 delays completion of Phase 3 of the downstream link equalization procedure until Phase 3 of the upstream link equalization procedure is complete. In this process, the downstream port 140 of the data regeneration device 110 waits during a spare time period at the end of Phase 3 of the downstream link equalization for Phase 3 of the upstream link equalization procedure to complete. In this way, the data regeneration device 110 synchronizes completion the upstream link equalization procedure with completion of the downstream link equalization procedure.

It is to be appreciated that the upstream port 130 of the data regeneration device 110 receives a digital signal from the downstream port 120 of the upstream component 105 indicating a completion of Phase 3 of the upstream link equalization procedure. In various embodiments, the digital signal includes TS1 Ordered Sets with an equalization control (EC) field set to zero. Moreover, the upstream port 130 of the data regeneration device 110 may receive the digital signal indicating completion of Phase 3 of the upstream link equalization procedure at any time within the time period specified for Phase 3 of a link equalization procedure in the PCIe 3.0 Specification. Because the data regeneration device 110 completes adjustment of the upstream link equalization procedure of the downstream link 145 in Phase 3 of the downstream link equalization procedure before starting Phase 3 of the upstream link equalization procedure on the upstream link 125, the data regeneration device 110 is capable of completing the downstream link equalization procedure upon completion of the upstream link equalization procedure. In this way, the data regeneration device 110 synchronizes completion of the upstream link equalization procedure with completion of the downstream link equalization procedure.

In various embodiments, the downstream port 140 of the data regeneration device 110 receives a synchronization signal from the upstream port 130 of the data regeneration device 110 through the corresponding routing link 135 indicating that Phase 3 of the upstream link equalization procedure is complete. In this way, the data regeneration device 110 synchronizes completion of Phase 3 of the upstream link equalization procedure with completion of Phase 3 of the downstream link equalization procedure. In some embodiments, the synchronization signal is a downstream digital signal of the high-speed pass-through mode of operation.

In step 530, arrived at from step 525 in which the completion of Phase 2 of the upstream link equalization procedure is delayed until the upstream port adjustment operation performed in Phase 3 of the downstream link equalization procedure is complete, the upstream equalization settings of the upstream link are adjusted in Phase 3 of the upstream link equalization procedure. In various embodiments, the upstream component 105 adjusts the upstream equalization settings of the upstream data link 125 by adjusting the receiver setting of the downstream port 120 of the upstream component 105 based on receiver equalization settings of the upstream data link 125 and adjusting the transmitter equalization settings of the upstream port 130 of the data regeneration device 110 based on the transmitter equalization settings of the downstream data link 145. In this process, the downstream port 120 of the upstream component 105 evaluates the upstream equalization settings of the upstream data link 125.

In various embodiments, the downstream port 120 of the upstream component 105 evaluates the upstream equalization settings of the upstream data link 125 by performing an evaluation process in compliance with the PCIe 3.0 protocol, as is described more fully herein. In various embodiments, the data regeneration device 110 performs the evaluation process in less than 24 ms, which is less than the maximum time of 24 ms for performing Phase 3 of a link equalization procedure in the PCIe 3.0 protocol.

Also in step 530, the upstream port 130 of the data regeneration device 110 provides a synchronization signal to the downstream port 140 of the data regeneration device 110 through the corresponding routing link 135. The synchronization signal indicates that Phase 3 of the upstream link equalization procedure performed on the upstream data link 125 is complete. For example, the synchronization signal may be TS1 Ordered Sets with an equalization control (EC) field set to zero. In turn, the downstream port 140 of the data regeneration device 110 completes Phase 3 of the downstream link equalization procedure by transmitting TS1 Ordered Sets with an equalization control (EC) field set to zero to the downstream component 115. The portion of the method 400 then ends.

In various embodiments, the portion of the method 400 illustrated in FIG. 5 may include more or fewer than the steps 505-550 illustrated in FIG. 5 and described above. In some embodiments, the steps 505-550 of the portion of the method 400 illustrated in FIG. 5 may be performed in a different order than the order illustrated in FIG. 5 and described above. In some embodiments, some of the steps 505-550 of the portion of the method 400 illustrated in FIG. 5 may be performed in parallel or substantially simultaneously. In various embodiments, one or more of the steps 505-550 may be performed more than once in the portion of the method 400 illustrated in FIG. 5.

Figure 6:
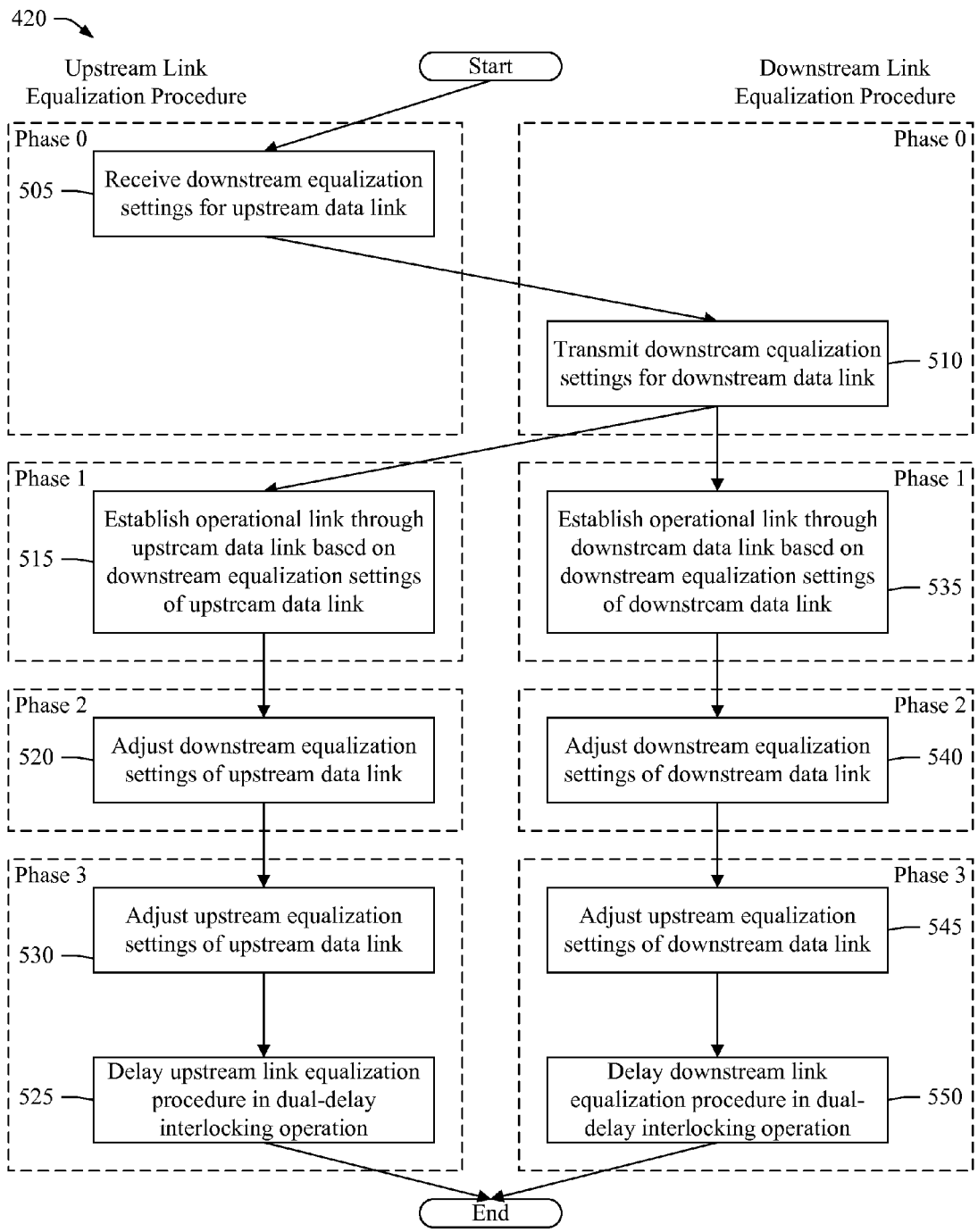
FIG. 6 is a flow chart for a portion of a method of regenerating a digital signal, in accordance with an embodiment of the present invention.

FIG. 6 illustrates a portion of the method 400 of regenerating the digital signal, in accordance with an embodiment of the present invention. The portion of the method 400 illustrated in FIG. 6 illustrates embodiments of step 420 of the portion of the method 400 illustrated in FIG. 4. The portion of the method 400 illustrated in FIG. 6 includes the steps 505-550 illustrated in FIG. 5. The steps 505-550 of the portion of the method 400 illustrated in FIG. 6 are performed in the same order as the steps 505-550 illustrated in FIG. 5 except that step 525 is performed in Phase 3 of the upstream equalization procedure after step 530. Moreover, one of the steps 525 or 550 is selectively performed in the portion of the method 400 illustrated in FIG. 6 to synchronize completion of Phase 3 of the upstream link equalization procedure with completion of Phase 3 of the downstream link equalization procedure.

In various embodiments of the portion of the method 400 illustrated in FIG. 6, step 530 of the upstream link equalization procedure starts at the same time step 545 of the downstream link equalization procedure. In some instances, step 530 completes in Phase 3 of the upstream link equalization procedure before step 545 completes in Phase 3 of the downstream link equalization procedure. In these instances, step 525 is performed to delay completion of Phase 3 of the upstream link equalization procedure until step 545 of the downstream link equalization procedure completes but step 550 is omitted in the method 400. In this way, step 525 is selectively performed and step 550 is selectively omitted in the method 400.

In another embodiment, step 545 completes in Phase 3 of the downstream link equalization procedure before step 530 completes in Phase 3 of the upstream link equalization procedure. In this embodiment, step 550 is performed to delay completion of Phase 3 of the downstream link equalization procedure until step 530 of the upstream link equalization procedure completes but step 525 is omitted in the method 400. In this way, step 550 is selectively performed and step 525 is selectively omitted in the method 400. By selectively performing either step 525 or step 550 and omitting the other step 525 or 550, the method 400 performs a dual-delay interlocking operation.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A data regeneration device for regenerating a digital signal in compliance with a Peripheral Component Interconnect Express (PCIe) protocol, the data regeneration device comprising:

an upstream port for performing an upstream link equalization procedure on an upstream data link in compliance with the PCIe protocol;

a downstream port for performing a downstream link equalization procedure on a downstream data link in compliance with the PCIe protocol, the data regeneration device configured to perform a dual-delay interlocking operation so that the downstream link equalization procedure and the upstream link equalization procedure complete at substantially the same time; and a routing link coupled to the upstream port and the downstream port for communicating a digital signal between the upstream port and the downstream port.

2. The data regeneration device of claim 1, wherein the PCIe protocol is the PCIe 3.0 protocol and wherein the upstream link equalization procedure includes a Phase 2 in compliance with the PCIe 3.0 protocol for performing a downstream port equalization adjustment operation on the upstream data link, the downstream link equalization procedure includes a Phase 3 in compliance with the PCIe 3.0 protocol for performing an upstream port equalization adjustment operation on the downstream data link, and the dual-delay interlocking operation includes delaying a completion of the Phase 2 of the upstream link equalization procedure until the upstream port equalization adjustment operation in Phase 3 of the downstream link equalization procedure is complete.

3. The data regeneration device of claim 2, wherein the upstream link equalization procedure includes a Phase 3 in compliance with the PCIe 3.0 protocol for performing an upstream port equalization adjustment operation on the upstream data link, and the dual-delay interlocking operation includes delaying a completion of Phase 3 of the downstream link equalization procedure until the Phase 3 of the upstream link equalization procedure is complete.

4. The data regeneration device of claim 3, wherein the upstream port equalization adjustment operation of Phase 3 of the downstream link equalization procedure includes an accelerated evaluation process.

5. The data regeneration device of claim 4, wherein the accelerated evaluation process includes a coarse evaluation operation and a fine evaluation operation, the coarse evaluation includes a continuous-time linear equalization but does not include a decision feedback equalization, and the fine evaluation includes both a continuous-time linear equalization and a decision feedback equalization.

6. The data regeneration device of claim 5, wherein the accelerated evaluation process is performed in less than three milliseconds.

7. The data regeneration device of claim 1, wherein the data regeneration device is further configured to regenerate the digital signal in compliance with the PCIe protocol at a low-speed data rate in a low-speed pass-through mode of operation, transition from the low-speed mode of operation to the equalization mode of operation seamlessly in compliance with the PCIe protocol, transition from the equalization mode of operation to a high-speed pass-through mode of operation in compliance with the PCIe protocol, and regenerate the digital signal in compliance with the PCIe protocol at a high-speed data rate in the high-speed pass-through mode of operation.

8. The data regeneration device of claim 1, wherein the upstream port is further configured to perform the upstream link equalization procedure for increasing a signal quality of a digital signal transmitted through the upstream data link, and wherein the downstream port is further configured to perform the downstream link equalization procedure for increasing a signal quality of a digital signal transmitted through the downstream data link.

9. A data regeneration device for regenerating a digital signal in compliance with a Peripheral Component Interconnect Express (PCIe) 3.0 protocol, the data regeneration device comprising:

an upstream port for performing an upstream link equalization procedure on an upstream data link in compliance with the PCIe 3.0 protocol;

a downstream port for performing a downstream link equalization procedure on a downstream data link in compliance with the PCIe 3.0 protocol, the data regeneration device is configured to perform a dual-delay interlocking operation so that the downstream link equalization procedure and the upstream link equalization procedure complete at substantially the same time; and a routing link coupled to the upstream port and the downstream port for communicating a digital signal between the upstream port and the downstream port, wherein the data regeneration device is further configured to regenerate the digital signal in compliance with the PCIe 3.0 protocol at a low-speed data rate in a low-speed pass-through mode of operation, transition from the low-speed pass-through mode of operation to the equalization mode of operation seamlessly in compliance with the PCIe 3.0 protocol, transition from the equalization mode of operation to a high-speed pass-through mode of operation in compliance with the PCIe 3.0 protocol, and regenerate the digital signal in compliance with the PCIe protocol at a high-speed data rate in the high-speed pass-through mode of operation.

10. The data regeneration device of claim 9, wherein the upstream link equalization procedure includes a Phase 2 in compliance to the PCIe 3.0 protocol for performing a downstream port equalization adjustment operation on the upstream data link, the downstream link equalization procedure includes a Phase 3 in compliance with the PCIe 3.0 protocol for performing an upstream port equalization adjustment operation on the downstream data link, and the data regeneration device is further configured to perform the dual-delay interlocking operation by delaying a completion of the Phase 2 of the upstream link equalization procedure until the upstream port equalization adjustment operation in Phase 3 of the downstream link equalization procedure is complete and by delaying a completion of the Phase 3 of the downstream link equalization procedure until a Phase 3 of the upstream link equalization procedure is complete.

11. The data regeneration device of claim 10, wherein the upstream port equalization adjustment operation of Phase 3 of the downstream link equalization procedure includes an accelerated evaluation process.

12. The data regeneration device of claim 11, wherein the accelerated evaluation process includes a coarse evaluation operation and a fine evaluation operation, the coarse evaluation includes a continuous-time linear equalization but does not include a decision feedback equalization, and the fine evaluation operation includes both a continuous-time linear equalization and a decision feedback equalization.

13. The data regeneration device of claim 12, wherein the accelerated evaluation process is performed in less than three milliseconds.

14. The data regeneration device of claim 9, wherein the downstream port is further configured to perform the downstream link equalization procedure for increasing a signal quality of a digital signal transmitted through the downstream data link, and wherein the upstream port is further configured to perform the upstream link equalization procedure for increasing a signal quality of a digital signal transmitted through the upstream data link.

15. A method of regenerating a digital signal in compliance with a Peripheral Component Interconnect Express (PCIe) protocol, the method comprising:

performing an upstream link equalization procedure on an upstream data link in compliance with the PCIe protocol;

performing a downstream link equalization procedure on a downstream data link in compliance with the PCIe protocol; and performing a dual-delay interlocking operation so that the downstream link equalization procedure and the upstream link equalization procedure complete at substantially the same time.

16. The method of claim 15, wherein the PCIe protocol is a PCIe 3.0 protocol and wherein the upstream link equalization procedure includes a Phase 2 in compliance with the PCIe 3.0 protocol for performing a downstream port equalization adjustment operation on the upstream data link, the downstream link equalization procedure includes a Phase 3 in compliance with the PCIe 3.0 protocol for performing an upstream port equalization adjustment operation on the downstream data link, and performing the dual-delay interlocking operation includes delaying a completion of the Phase 2 of the upstream link equalization procedure until the upstream port equalization adjustment operation in Phase 3 of the downstream link equalization procedure is complete.

17. The method of claim 16, wherein the upstream link equalization procedure includes a Phase 3 in compliance with the PCIe 3.0 protocol for performing an upstream port equalization adjustment operation on the upstream data link, and performing the dual-delay interlocking operation includes delaying a completion of Phase 3 of the downstream link equalization procedure until the Phase 3 of the upstream link equalization procedure is complete.

18. The method of claim 17, wherein the upstream port equalization adjustment operation includes an accelerated evaluation process including a coarse evaluation operation and a fine evaluation operation, the coarse evaluation operation includes performing a continuous-time linear equalization but does not include performing a decision feedback equalization, and the fine evaluation includes performing both a continuous-time linear equalization and a decision feedback equalization.

19. The method of claim 15, further comprising:

transmitting the digital signal between the upstream port and the downstream port in compliance with the PCIe 3.0 protocol at the low-speed data rate in a low-speed pass-through mode of operation;

transitioning from the low-speed mode of operation to an equalization mode of operation seamlessly in compliance with the PCIe protocol;

performing both the upstream link equalization procedure and the downstream link equalization procedure in the equalization mode of operation;

transitioning from the equalization mode of operation to a high-speed mode of operation seamlessly in compliance with the PCIe protocol; and transmitting the digital signal between the upstream port and the downstream port in compliance with the PCIe protocol at the high-speed data rate in the high-speed pass-through mode of operation.

* * * * *